US012467757B2

(12) United States Patent
Karatzoglou et al.

(10) Patent No.: US 12,467,757 B2
(45) Date of Patent: Nov. 11, 2025

(54) IDENTIFYING AND RESOLVING PROHIBITED MANEUVERS IN ROUTES GENERATED BY A ROUTING SYSTEM

(71) Applicant: Microsoft Technology Licensing, LLC, Redmond, WA (US)

(72) Inventors: Antonios Karatzoglou, San Francisco, CA (US); Tijana Bekic, Belgrade (RS); Vashutosh Agrawal, Bellevue, WA (US); Mohit Khanna, Bellevue, WA (US); Varun Kakkar, Redmond, WA (US); Michael Robert Evans, Seattle, WA (US); Jacob Nicholas Whitbeck, Redmond, WA (US); Dragomir Dimitrov Yankov, Palo Alto, CA (US); Nikola Perin, Belgrade (RS); Nikola Todic, Belgrade (RS); Goran Predovic, Bellevue, WA (US); Aleksandar Samardzija, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 18/369,346

(22) Filed: Sep. 18, 2023

(65) Prior Publication Data
US 2025/0093165 A1    Mar. 20, 2025

(51) Int. Cl.
*G01C 21/34*    (2006.01)
*G01C 21/00*    (2006.01)
(52) U.S. Cl.
CPC ........ *G01C 21/3461* (2013.01); *G01C 21/38* (2020.08)

(58) Field of Classification Search
CPC ............................ G01C 21/3461; G01C 21/38
See application file for complete search history.

(56) References Cited

U.S. PATENT DOCUMENTS 9,019,129 B2 *    4/2015  Skinder ................. G01C 21/20
                                                  701/469
11,709,250 B2 *   7/2023  Fu ......................... G01S 17/931
                                                  342/70
(Continued)

OTHER PUBLICATIONS

Bandil, et al., "GeoDart: A System for Discovering Maps Discrepancies," in 2021 IEEE 37th International Conference on Data Engineering (ICDE), 2021 pp. 2535-2546.*
(Continued)

*Primary Examiner* — Abdalla A Khaled

(57) ABSTRACT

A technique automatically identifies and resolves prohibited maneuvers in candidate routes generated by a routing system. Examples of prohibited maneuvers include traveling over a non-navigable path, traveling in an incorrect direction over a roadway, and an improper turn. The technique determines whether the candidate routes contain prohibited maneuvers by comparing the candidate routes with plural types of route-related validation data in plural respective validation processes. For example, a first validation process compares the candidate routes with a collection of GPS traces. A second validation process compares the candidate routes with map reference data. The technique further includes provisions for correcting the causes of identified prohibited maneuvers. Overall, the technique reduces the amount of manual effort involved in verifying the accuracy of routes produced by the routing system, and improves the accuracy, reliability, and safety of the routing system.

20 Claims, 13 Drawing Sheets

(56) References Cited

U.S. PATENT DOCUMENTS

| | | | | |
|---|---|---|---|---|
| 11,738,770 | B2* | 8/2023 | Han | B60W 50/14<br>701/25 |
| 2013/0267260 | A1* | 10/2013 | Chao | G09B 29/005<br>455/457 |
| 2014/0232570 | A1* | 8/2014 | Skinder | G01C 21/20<br>340/989 |
| 2015/0204670 | A1* | 7/2015 | Morrison | G01C 21/38<br>701/410 |
| 2020/0208998 | A1* | 7/2020 | Xiang | G06F 16/29 |
| 2020/0314598 | A1* | 10/2020 | Lissick | G01C 21/38 |
| 2021/0001891 | A1* | 1/2021 | Majithia | B60W 60/0025 |
| 2021/0063166 | A1* | 3/2021 | Rolf | G01C 21/30 |
| 2021/0063168 | A1* | 3/2021 | Rolf | G06F 16/219 |
| 2021/0404829 | A1* | 12/2021 | St. Romain | G08G 1/0129 |
| 2023/0080319 | A1* | 3/2023 | Zhang | G01C 21/3415<br>701/26 |

OTHER PUBLICATIONS

Efentakis, et al., "Crowdsourcing turning restrictions for OpenStreetMap," in EDBT/ICDT 2014 Joint Conference, 2-14, pp. 355-362.*

Karatzoglou, et al., "Exploring The Use of OpenStreetMap Data (OSM) and GPS Traces for Validating Driving Routes and Identifying Prohibited Maneuvers in Direction Services," in GeoIndustry '23: Proceedings of the 2nd ACM SIGSPATIAL International Workshop on Spatial Big Data and AI for Industrial Applications, Nov. 2023, pp. 22-31.

Bandil, et al., "An Interactive System to Compare, Explore and Identify Discrepancies across Map Providers," in SIGSPATIAL '20: Proceedings of the 28th International Conference on Advances in Geographic Information Systems, Nov. 2020, 4 pages.

Bastani, et al., "Inferring and Improving Street Maps with Data-Driven Automation," in Communications of the ACM, Nov. 2021, vol. 64, No. 11, 11 pages.

Biagioni, et al., "Inferring Road Maps from Global Positioning System Traces: Survey and Comparative Evaluation," In Transportation Research Record, 2291(1), published online Jan. 1, 2012, pp. 61-71.

Cao, et al., "From GPS Traces to a Routable Road Map," in GIS '09: Proceedings of the 17th ACM SIGSPATIAL International Conference on Advances in Geographic Information Systems, Nov. 2009, pp. 3-12.

Fathi, et al., Detecting Road Intersections from GPS Traces, in GIScience 2010, Sixth International Conference on Geographic Information Science, Sep. 2010, LNCS 6292, pp. 56-69.

Flanagin, et al., "The credibility of volunteered geographic information," in GeoJournal 72, 2008, pp. 137-148.

Goodchild, et al., "Citizens as sensors: the world of volunteered geography," in GeoJournal 69, 2007, pp. 211-221.

Graser, et al., "Is OSM Good Enough for Vehicle Routing? A Study Comparing Street Networks in Vienna," in Gartner, et al. (eds), Progress in Location-Based Services 2014, Lecture Notes in Geoinformation and Cartography, Springer, Jan. 2014, 15 pages.

Karatzoglou, et al., "Applying Network Kernel Density Estimation (NKDE) and Temporal Network Kernel Estimation (TNKDE) for Generating Safer Routes," in IWCTS '22: Proceedings of the 15th ACM SIGSPATIAL International Workshop on Computational Transportation Science, Article No. 10, Nov. 2022, pp. 26-35.

Liu, e al., "Mining Large-Scale, Sparse GPS Traces for Map Inference: Comparison of Approaches," in KDD'12: Proceedings of the 18th ACM SIGKDD International Conference on Knowledge Discovery and Data Mining, Aug. 2012, pp. 669-677.

Newson, et al., "Hidden Markov Map Matching Through Noise and Sparseness," in GIS '09: Proceedings of the 17th ACM SIGSPATIAL International Conference on Advances in Geographic Information Systems, Nov. 2009, pp. 336-343.

Rogers, et al., "Mining GPS Data to Augment Road Models," in KDD '99: Proceedings of the fifth ACM SIGKDD International Conference on Knowledge Discovery and Data Mining, Aug. 1999, pp. 104-113.

Schmidl, et al., "An Approach to Assess the Effect of Currentness of Spatial Data on Routing Quality," in AGILE-GISS, Proceedings of the 24th AGILE Conference on Geographic Information Science, vol. 2, No. 13, Jun. 2021, 12 bages.

Schroedl, et al., "Mining GPS Traces for Map Refinement," in Data Mining and Knowledge Discovery, vol. 9, Issue 1, Jul. 2004, pp. 59-87.

Tavakoli, et al., "Building and Road Extraction from Aerial Photographs," in Journal of IEEE Transactions on Systems, Man, and Cybernetics, vol. 12, Issue 1, Jan. 1982, pp. 84-91.

Wang, et al., "CrowdAtlas: Self-Updating Maps for Cloud and Personal Use." in MobiSys '13: Proceeding of the 11th Annual International Conference on Mobile Systems, Applications, and Services, Jun. 2013, pp. 27-40.

Yin, et al., "A Multi-task Learning Framework for Road Attribute Updating via Joint Analysis of Map Data and GPS Traces," in WWW '20: Proceedings of The Web Conference 2020, Apr. 2020, pp. 2662-2668.

Zhang, et al., "Integration of GPS Traces with Road Map," in IWCTS '10: Proceedings of the Third International Workshop on Computational Transportation Science, Nov. 2010, pp. 17-22.

Wang, et al., "Mining Large-Scale GPS Streams for Connectivity Refinement of Road Maps," in SIGSPATIAL'13: Proceedings of the 21st ACM SIGSPATIAL International Conference on Advances in Geographic Information Systems, Nov. 2013, pp. 438-441.

Zhu, et al., "Mining Large-Scale GPS Streams for Connectivity Refinement of Road Maps," in The Computer Journal, vol. 58, No. 9, Sep. 2015, pp. 2109-2119.

"STBuffer (geometry Data Type)," available at https://learn.microsoft.com/en-us/sql/t-sql/spatial-geometry/stbuffer-geometry-data-type?view=sql-server-ver16, Microsoft SQL documentation, Microsoft Corporation, Redmond, Washington, May 23, 2023, 7 pages.

"STBuffer (geography Data Type)," available at https://learn.microsoft.com/en-US/sql/t-sql/spatial-geography/stbuffer-geography-data-type?view=sql-server-ver16, Microsoft SQL documentation, Microsoft Corporation, Redmond, Washington, Feb. 28, 2023, 3 pages.

"Bing Maps Tile System," retrieved from: https://learn.microsoft.com/en-us/bingmaps/articles/bing-maps-tile-system, Microsoft Corporation, Redmond, Washington, Jun. 8, 2022, 12 pages.

"Azure Databricks documentation," available in https:/learn.microsoft.com/en-us/azure/databricks/, Microsoft Azure, Microsoft Corporation, Redmond, Washington, retrieved on Sep. 16, 2023, 4 pages.

"SqlGeometry Class," available at https://learn.microsoft.com/en-us/dotnet/api/microsoft.sqlserver.types.sqlgeometry?view=sql-dacfx-161, Documentation, Microsoft Corporation, Redmond, Washington, retrieved on Sep. 16, 2023, 8 pages.

Delling, et al., "Customizable Route Planning in Road Networks," available at https://www.microsoft.com/en-us/research/publication/customizable-route-planning-in-road-networks/, Jul. 24, 2013, 31 pages.

"List of online map services," available at https://en.wikipedia.org/wiki/List_of_online_map_services, Wikipedia article, accessed on Aug. 16, 2023, 11 pages.

Bogyrbayeva, et al., "Learning to Solve Vehicle Routing Problems: A Survey," arXiv, arXiv:2205.02453v1 [cs.LG], May 5, 2022, 21 pages.

"Pathfinding," available at https://en.wikipedia.org/wiki/Pathfinding, Wikipedia article, accessed on Sep. 16, 2023, 6 pages.

"Shortest path problem," https://en.wikipedia.org/wiki/Shortest_path_problem, Wikipedia article, accessed on Sep. 16, 2023, 12 pages.

"Bing Maps," available at https://en.wikipedia.org/wiki/Bing_Maps, Wikipedia article, accessed on Sep. 16, 2023, 19 pages.

* cited by examiner

| Route Legality Score | Ground Truth | Ref. Map Only | GPS Traces Only | GPS Traces → Ref. Map | GPS Traces + Ref. Map |
|---|---|---|---|---|---|
| One-Way Restrictions (OWR) | 3.3% (43) | 2.45% (32) | 2.14% (28) | 1.6% (21) | 2.99% (39) |
| | 0.23% (3) | 0.07% (1) | 0.15% (2) | 0.07% (1) | 0.15% (2) |
| Navigability (NAV) | 1.91% (25) | 1.61% (21) | 1.61% (21) | 1.28% (18) | 1.84% (24) |
| Turn Restriction (TR) | 1.46% (19) | 0.99% (13) | 0.54% (7) | 0.3% (4) | 1.3% (18) |

OVERVIEW OF OPERATION OF THE VALIDITY-TESTING SYSTEM, 1302

RECEIVE A SET OF CANDIDATE ROUTES PRODUCED BY THE ROUTING SYSTEM USING ROUTING-ENGINE NETWORK DATA, THE SET OF CANDIDATE ROUTES HAVING DIFFERENT STARTING AND ENDING LOCATIONS.
1304

RECEIVE FIRST ROUTE-RELATED VALIDATION DATA FROM A FIRST SOURCE.
1306

RECEIVE SECOND ROUTE-RELATED VALIDATION DATA FROM A SECOND SOURCE.
1308

PRODUCE FIRST VALIDATION RESULTS BY COMPARING THE SET OF CANDIDATE ROUTES WITH THE FIRST ROUTE-RELATED VALIDATION DATA.
1310

PRODUCE SECOND VALIDATION RESULTS BY COMPARING THE SET OF CANDIDATE ROUTES WITH THE SECOND ROUTE-RELATED VALIDATION DATA.
1312

IDENTIFY PROHIBITED MANEUVERS IN THE SET OF CANDIDATE ROUTES THAT ARE INDEPENDENTLY CONFIRMED BY BOTH THE FIRST VALIDATION RESULTS AND THE SECOND VALIDATION RESULTS.
1314

REVISE THE ROUTING SYSTEM TO ELIMINATE OR REDUCE AT LEAST ONE FACTOR THAT IS CAUSING GENERATION OF ROUTES CONTAINING THE PROHIBITED MANEUVERS IDENTIFIED IN BLOCK 1314.
1316

FIG. 13

OVERVIEW OF OPERATION OF THE VALIDITY-TESTING SYSTEM, 1402

RECEIVING A SET OF CANDIDATE ROUTES PRODUCED BY THE ROUTING SYSTEM USING ROUTING LOGIC THAT OPERATES ON ROUTING-ENGINE NETWORK DATA, THE SET OF CANDIDATE ROUTES HAVING DIFFERENT STARTING AND ENDING LOCATIONS.
1404

RECEIVE A COLLECTION OF TRACES MEASURED BY POSITION-DETERMINING DEVICES AS THE POSITION-DETERMINING DEVICES TRAVERSE ACTUAL ROUTES.
1406

RECEIVE REFERENCE MAP DATA.
1408

PRODUCE FIRST VALIDATION RESULTS BY COMPARING THE SET OF CANDIDATE ROUTES WITH THE COLLECTION OF TRACES.
1410

PRODUCE SECOND VALIDATION RESULTS BY COMPARING THE SET OF CANDIDATE ROUTES WITH THE REFERENCE MAP DATA.
1412

DETERMINE PROHIBITED MANEUVERS IN THE SET OF CANDIDATE ROUTES THAT ARE INDEPENDENTLY CONFIRMED BY BOTH THE FIRST VALIDATION RESULTS AND THE SECOND VALIDATION RESULTS.
1414

REVISE THE ROUTING-ENGINE NETWORK DATA AND/OR THE ROUTING LOGIC OF THE ROUTING SYSTEM TO ELIMINATE OR REDUCE AT LEAST ONE FACTOR THAT IS CAUSING GENERATION OF ROUTES CONTAINING THE PROHIBITED MANEUVERS DETERMINED IN BLOCK 1412.
1416

FIG. 14

OVERVIEW OF THE GPS-BASED VALIDATION PROCESS, 1502

IDENTIFY A GROUP OF TRACES WITHIN A PRESCRIBED GEOGRAPHIC PROXIMITY TO A PARTICULAR CANDIDATE ROUTE.
1504

DETERMINE WHETHER A PARTICULAR SEGMENT OF THE PARTICULAR CANDIDATE ROUTE IS FOUND IN AT LEAST A FIRST PRESCRIBED NUMBER OF TRACES IN THE GROUP OF TRACES, AT A SAME TIME AT WHICH THE PARTICULAR SEGMENT OCCURS.
1506

IDENTIFY A PAIR OF SEGMENTS IN THE CANDIDATE ROUTE THAT IS JOINTED AT A POINT ASSOCIATED WITH A ROUTE MANEUVER.
1508

DETERMINE WHETHER THE PAIR OF SEGMENTS IN THE PARTICULAR CANDIDATE ROUTE IS FOUND IN AT LEAST A SECOND PRESCRIBED NUMBER OF TRACES IN THE GROUP OF TRACES, AT A SAME TIME AT WHICH THE PAIR OF SEGMENTS OCCURS.
1510

FIG. 15

OVERVIEW OF THE REFERENCE MAP VALIDATION PROCESS, 1602

IDENTIFY A SET OF ROUTE ENTITIES IN THE ROUTING-ENGINE NETWORK DATA OR THE REFERENCE MAP DATA, EACH ROUTE ENTITY DESCRIBING A ROUTE PORTION HAVING COMMON PROPERTIES.
1604

BASED THE SET OF ROUTE ENTITIES THAT ARE IDENTIFIED, IDENTIFY A PAIR OF NEIGHBORING ROUTE ENTITIES IN A PARTICULAR CANDIDATE ROUTE THAT ARE JOINED AT A MANEUVER POINT ASSOCIATED WITH A MANEUVER, THE TWO NEIGHBORING ROUTE ENTITIES HAVING A FIRST NEIGHBORING ROUTE ENTITY AND A SECOND NEIGHBORING ROUTE ENTITY.
1606

IDENTIFY A FIRST MINI-ROUTE, USING THE ROUTING-ENGINE NETWORK DATA, BETWEEN A BEGINNING POINT OF THE FIRST NEIGHBORING ROUTE ENTITY AND AN ENDING POINT IN THE SECOND NEIGHBORING ROUTE ENTITY.
1608

IDENTIFY A SECOND MINI-ROUTE, BASED ON THE MAP REFERENCE DATA, BETWEEN THE BEGINNING POINT OF THE FIRST NEIGHBORING ROUTE ENTITY AND THE ENDING POINT OF THE SECOND NEIGHBORING ROUTE ENTITY.
1610

DETERMINE WHETHER THE FIRST MINI-ROUTE MATCHES THE SECOND MINI-ROUTE.
1612

FIG. 16

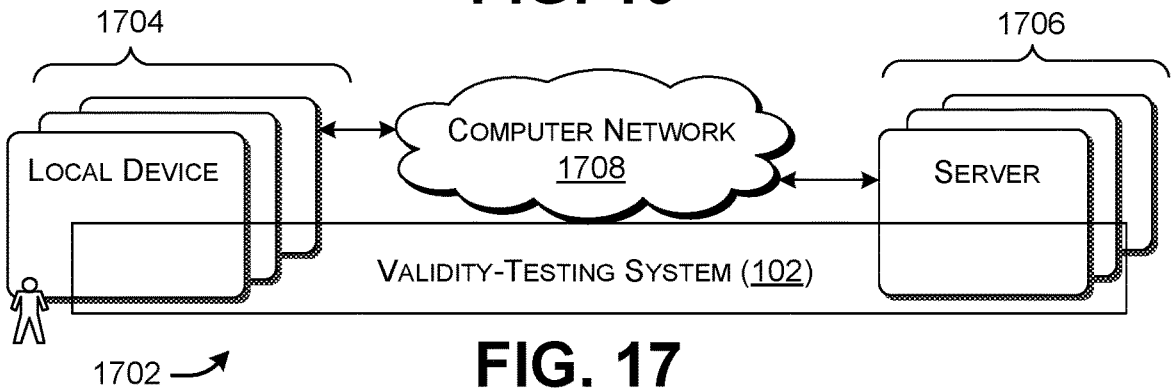

FIG. 17

IDENTIFYING AND RESOLVING PROHIBITED MANEUVERS IN ROUTES GENERATED BY A ROUTING SYSTEM

BACKGROUND

Route-planning engines are now in widespread use, but they are not infallible. In certain cases, a route-planning engine generates a route that contains a prohibited maneuver. For instance, a route-planning engine can generate a route leg that is not accessible to a particular user at the current time (or at any time). In another case, a route-planning engine may direct the user to turn onto a route leg in a manner that is prohibited by applicable law. These types of situations create delays in a user's trip and/or can even jeopardize the safety of the user and others.

To address this situation, a developer typically manually reviews the accuracy of routes produced by a route-planning engine. This type of review, however, is resource-intensive, time-consuming, expensive, and prone to error.

SUMMARY

A sample-based evaluation technique is described herein for automatically identifying prohibited maneuvers in candidate routes that a routing system generates using routing-engine network data. The routing-engine network data describes at least the road network within a particular geographic region. The technique then makes changes to the routing system to remove or reduce issues which are causing the routing system to produce routes that contain prohibited maneuvers. The technique is technically advantageous because it provides a resource-efficient and time-efficient way of improving the quality and safety of routes produced by the routing system.

In some implementations, the technique determines whether the candidate routes contain prohibited maneuvers based on the results of plural independently-performed validation processes. Each validation process compares the candidate routes to a particular kind of route-related validation data. For example, a first validation process compares the candidate routes to a collection of traces produced by position-determining devices (e.g., Global Positioning System (GPS) devices). A second validation process compares the candidate routes to map reference data. Other possible types of route-related validation data are described in the Detailed Description.

In some implementations, the technique judges a particular candidate route free from prohibited maneuvers if all validation processes independently confirm this conclusion. In other implementations, the technique deems a particular candidate route free from prohibited maneuvers based on a consideration of the combination of probabilistic validation results produced by the separate validation processes.

In some implementations, the technique addresses a prohibited maneuver by correcting an error in the engine routing network data. Alternatively, or in addition, the technique addresses a prohibited maneuver by modifying logic that the routing system uses to generate the routes.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 is a process that explains one manner of operation of the validity-testing system of FIG. 1.

FIG. 14 is a process that represents a particular implementation of the process of FIG. 13.

FIG. 15 is a process that explains one manner of operation of the GPS-based validating system of FIG. 2.

FIG. 16 is a process that explains one manner of operation of the map-based validating system of FIG. 5.

FIG. 17 shows computing equipment that, in some implementations, is used to implement the validity-testing system of FIG. 1.

The same numbers are used throughout the disclosure and figures to reference like components and features.

DETAILED DESCRIPTION

Section A. Overview of Validity-Testing System

Figure 1:
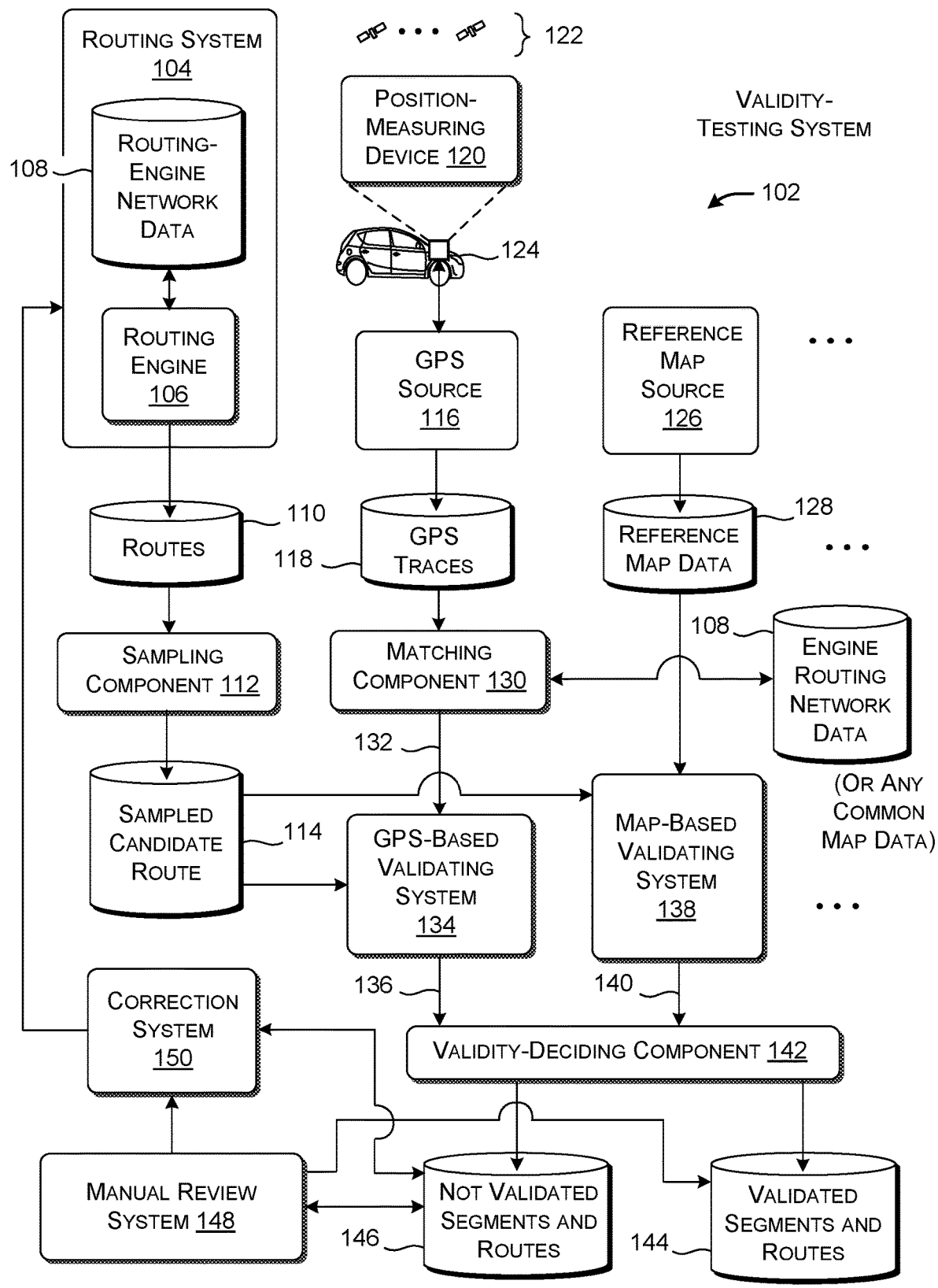
FIG. 1 shows a validity-testing system for identifying and resolving prohibited maneuvers in routes generated by a routing system.

FIG. 1 shows a validity-testing system 102 for identifying and resolving factors that cause a routing system 104 to produce routes having prohibited maneuvers. The routing system 104 includes a routing engine 106 having routing logic (not shown) that generates the routes based on routing-engine network data in a data store 108. The routing-engine network data describes a road network in a particular region, including any of a particular city, state or province, country, continent, etc. For instance, the routing-engine network data describes the locations of roads in the region, the structure of the roads (such as the lane structures of the roads and the road surface types of the roads), the rules associated with those roads (such as speed limits and any restrictions associated with the roads), the current conditions of those roads, etc. A data store 110 stores the routes generated by the routing system 104 in response to queries submitted by end users.

A maneuver is an action taken while navigating a route, or a change in state that is encountered while navigating the route. The change in state can refer to a change in the characteristics of the road network over which the vehicle navigates (including any of a change in road name, surface type, speed limit, lane structure, etc.). A prohibited (or improper) maneuver describes a navigation option that is prohibited by any rule-making authority, or is prohibited for any other reason. For example, a route exhibits a first kind of prohibited maneuver by specifying navigation over a route portion that is non-navigable. In some cases, a route portion is non-navigable because it is a private road, a service road, or a passage that is restricted for any other reason. This type of route is commonly found at military bases, airports, etc. In other cases, a route portion is non-navigable to vehicle traffic because it is designated for pedestrian use. In other cases, a route portion is non-navigable simply because does it not exist in reality in any form.

A route exhibits a second kind of prohibited maneuver by specifying a prohibited turn, e.g., by specifying a prohibited left turn, right turn, U-turn, ramp-related turn, etc. A route exhibits a third class of prohibited maneuver by specifying navigation on a route portion in an improper direction, e.g., by specifying navigation over a one-way street in the wrong direction. Other implementations define yet other classes of prohibited operations, and/or omit one or more of the classes described above.

From a high-level perspective, the validity-testing system 102 provides a tool by which a developer or other user can quickly and efficiently determine the accuracy of the routing system 104, and take action to resolve identified errors in the operation of the routing system 104. The validity-testing system 102 is efficient because it automatically classifies the majority of routes, without prompting the user to make manual classification decisions. Alternatively, or in addition, the validity-testing system 102 automatically takes action to identify and correct the causes of prohibited maneuvers in identified candidate routes. The efficiency of the technique reduces the amount of time required to review a collection of routes (e.g., in one case, by reducing review time from 10-12 hours to 1.5 hours). Commensurate therewith, the technique reduces the amount of resources (e.g., memory resources and processor resources) expended in a review session.

Further, the validity-testing system 102 appropriately balances the coverage of its automatic classification (that controls the percentage of routes that are automatically classified) with the risk of generating false negatives (in which a prohibited maneuver is falsely classified as correct). Although it is possible to increase the coverage of the technique, doing so runs the risk of increasing the likelihood of false negatives. By contrast, an ad hoc approach of reviewing routes provides no assurance that it will produce complete, accurate, and consistent review results. Incomplete and/or erroneous results increase the risk that the routing system 104 will generate erroneous, inefficient, and potentially unsafe routes.

The validity-testing system 102 validates each candidate route with respect to plural independently-performed validation processes. The different validation processes operate on different respective instances of route-related validation data. FIG. 1 specifically describes one example in which a first validation process compares each candidate route with a group of Global Positioning System (GPS) traces provided by a plurality of position-determining devices as the devices traverse actual routes. A second validation process compares each candidate route with reference map data. The reference map data describes the same roadway network as the routing-engine network data (used by the routing system 104), but, in some cases, is produced independently of the routing-engine network data. In some cases, the reference map data refers to map data produced by a crowdsourcing system, e.g., as provided by the OpenStreetMap (OSM) organization, headquartered in Cambridge, United Kingdom. The use of plural validation processes improves the ability of the validity-testing system 102 to accurately analyze routes in an automated fashion with a reduced incidence of false negatives. Other implementations of the validity-testing system 102 use more than two validation processes (and corresponding types of route-related validation data), and/or can omit the use of one or more validation processes shown in FIG. 1.

Figure 18:
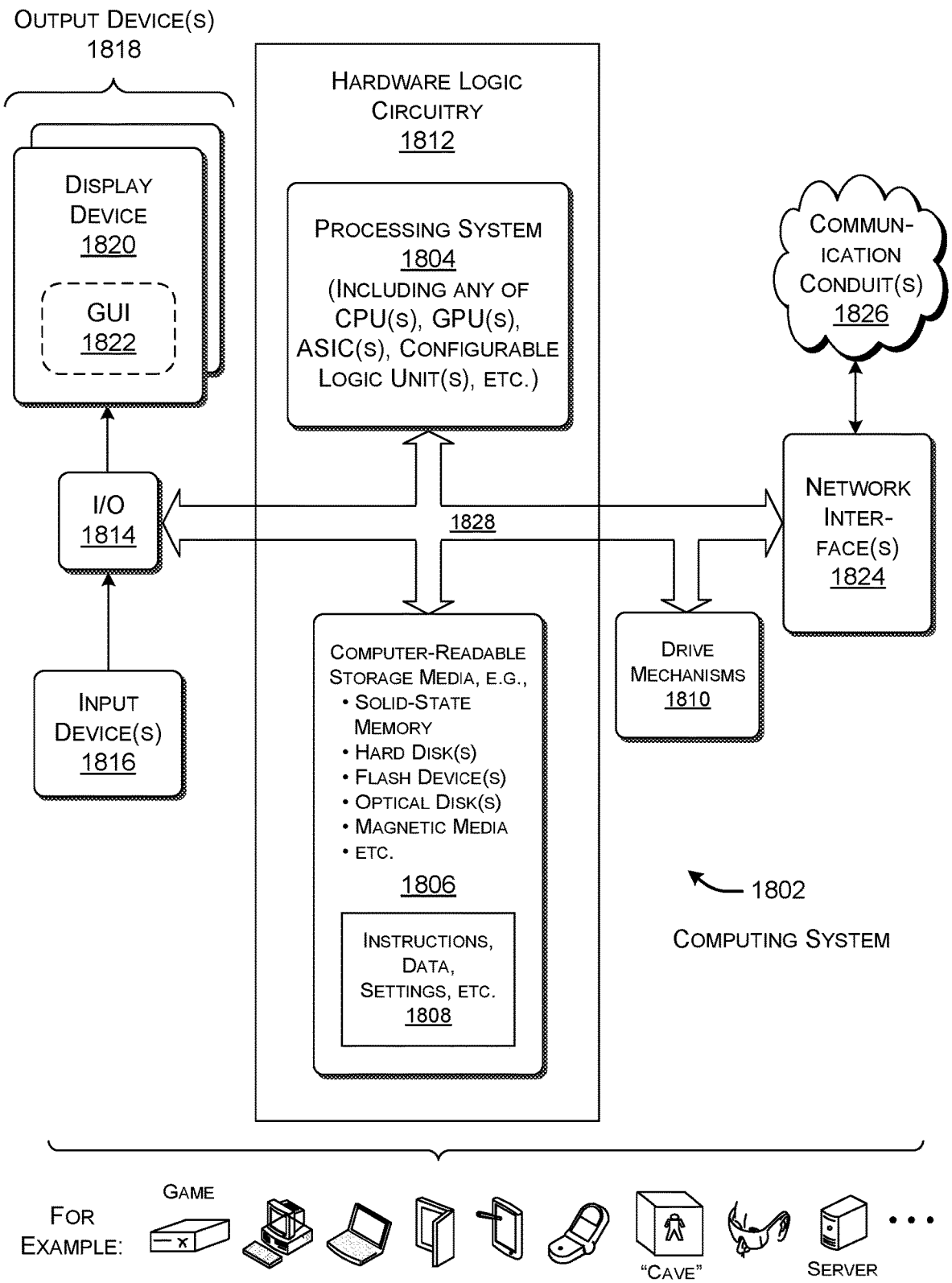
FIG. 18 shows an illustrative type of computing system that, in some implementations, is used to implement any aspect of the features shown in the foregoing drawings.

With the above introduction, an overview of the validity-testing system 102 is now provided, generally describing FIG. 1 in a top-down manner. Later section of the Detailed Description provide additional details regarding individual components of the validity-testing system 102. By way of terminology, in some examples, terms such as "component," "module," "engine," and "tool" refer to parts of computer-based technology that perform respective functions. FIGS. 17 and 18 described below, provide examples of illustrative computing equipment for performing these functions. In some examples, a machine-trained model (or "model" for brevity) refers to computer-implemented logic for executing a task using machine-trained weights that are produced in a training operation.

The data store 110 stores a large collection of routes produced by the routing system 104. More specifically, in some cases, the data store 110 stores actual routes produced by the routing system 104 upon request by end users. Alternatively, or in addition, the data store 110 stores test routes produced by the routing system 104 in response to test requests. The data store 110 also stores various metadata regarding each route, including trip date, route length, route duration, latitude and longitude pairs that make up the route's path, trip itinerary information that describes the route's path legs, and maneuver types within the route. In some implementation, the data store 110 also stores tile IDs of tiles associated with each route. A tile refers to an n×m (e.g., 5 km by 5 km) portion of a map which the route passes through. A route may pass through one or more tiles.

A sampling component 112 selects a subset of the routes in the data store 110 based on input filtering criteria. For example, the sampling component 112 selects routes within a given timeframe and/or within a given geographic region. The routes will have different starting and ending locations, although two or more routes in the set can also have the same starting and/or ending locations. Alternatively, or in addition, the sampling component 112 select routes having other specified characteristics, such as distances, start times, and/or durations. Alternatively, or in addition, the sampling component 112 selects a distribution of routes having specified characteristics, such as by providing a prescribed percentage of routes having a first distance, and another prescribed percentage of routes having a second distance. In those cases in which the selected routes were actually delivered to end users, the sampling component 112 appropriately anonymizes the routes, e.g., by stripping the route data of information that identifies the end user, the end user's vehicle, the end user's starting location, and the end user's destination location. A data store 114 stores the selected routes, which are referred to herein as candidate routes.

Each candidate route has a sequence of one or more segments having associated segment IDs. A segment refers to a portion of the route, typically corresponding to an edge between two vertices in map data. In some implementations, a segment is also defined such that its endpoints may be associated with intersections, but it otherwise includes no mid-segment intersections. In some implementations, the data store 114 also stores a direction associated with each segment, which refers to a direction in which the segment is to be traversed. A road portion that allows two-way traffic is described by two segments, a first which refers to navigation over the road portion in a first direction, and a second which refers to navigation over the road portion in a second direction A GPS source 116 refers to any service that collects GPS traces. A data store 118 stores the collected GPS traces. A GPS trace refers to a series of temporally-stamped GPS measurements. A position-measuring device 120, in cooperation with a satellite system 122, produces the GPS measurements as a vehicle 124 traces a route. For example, the position-measuring device 120 captures a timestamped GPS measurement every three seconds. In some implementations, the GPS source 116 also produces metadata pertaining to each trace, including a trip ID associated with the route, date information, speed information, heading information, location information (e.g., latitude and longitude information), tile ID information, etc. In addition, or alternatively, other implementations collect and utilize other types of position measurements. Another type of measuring device, for instance, assesses the device's position by triangulating signals produced by terrestrial wireless transmitters. Another type of measuring device assesses the device's position based on the device's proximity to one or more wireless beacons having predetermined fixed locations.

A noise-removal component (not shown) removes outlier GPS measurements in the GPS traces that represent noise. These outlier GPS measurements convey unrealistically high speed values and/or exhibit scattered outlier signals caused primarily by atmospheric effects or reflection (e.g., "multi-path") effects, often seen in areas with densely-located tall structures, as found in urban settings and canyons. Note that the validity-testing system 102 can perform this noise-removal operation at any juncture of the processing flow described in FIG. 1.

A reference map source 126 refers to any source of reference map data. A data store 128 stores the reference map data. As mentioned above, one source of reference map data corresponds the OpenStreetMap organization which provides crowdsourced map data. In other cases, the reference map data refers to propriety map data produced by a private company. Examples of this category of maps include: Bing Maps produced by Microsoft Corporation of Redmond, Washington; Google Maps provided by Alphabet Inc. of Mountain View, California; Apple Maps, provided by Apple Inc. of Cupertino California; Yandex Maps provided by Yandex of Moscow Russia, and so on.

A matching component 130 "snaps" the GPS traces to the road network described in common map data. In some cases, the common map data is the route-engine network data used by the routing system 104. Snapping a GPS trace involves adjusting each GPS measurement in the GPS trace so that it lies on a route in the common map data. As a result of its processing, the matching component 130 produces map-matched GPS traces 132. Each map-matched GPS trace includes one or more segments described by respective segment IDs.

Although not shown, the matching component 130 can also perform a map-matching operation with respect to any other route-related validation data, and/or the candidate routes themselves. The goal of all such operations is to standardize the different streams of data so that the streams can be meaningfully compared with each other in the next stage of processing.

A GPS-based validation system 134 performs a first validation process. This process involves identifying prohibited maneuvers (if any) in the candidate routes by comparing the candidate routes with the GPS traces. The GPS-based validation system 134 produces first validation results 136 as a result of its processing. The first validation results 136 identify matched and unmatched segments of the candidate routes. Unmatched segments represent possible prohibited maneuvers that require further attention. Section B (below) provides further details regarding one manner of operation of the GPS-based validation system 134.

A map-based validating system 138 performs a second validation process. This process involves identifying prohibited maneuvers (if any) in the candidate routes by comparing the candidate routes with reference map data. The map-based validation system 138 produces second validation results 140 as a result of its processing. The second validation results 140 identify matched and unmatched segments of the candidate routes. Again, unmatched segments represent possible prohibited maneuvers. Section C (below) provides further details regarding the operation of the map-based validation system 138.

As mentioned above, although FIG. 2 only shows two validation processes, other implementations include more than two validation processes. In some implementations, the validity-testing system 102 performs each validation process in an independent fashion, e.g., separate from other validation processes, and in parallel with the other validation processes. For example, another validation system (not shown) compares the candidate routes with image-based reference data, e.g., as provided by aerial sources and/or satellites. In some implementations, for example, this type of validation system converts a candidate route to a route image, and then compares this route image to an aerial (and/or satellite) image of the road network under consideration. In other cases, this validation system uses any type of machine-trained model (such as a deep neural network) to extract features of the aerial (and/or satellite) image of the road network under consideration. The validation system then compares these feature with the road network under consideration.

A feedback validation system (not shown) compares the candidate routes with feedback information provided by users who are using the routing engine 104 (and/or one or more other routing engines) to traverse routes. In part, for example, this feedback information identifies permitted and prohibited maneuvers encountered by the users as they navigate the road network of a particular region. In some implementations, the feedback validation system weights the feedback information based on how recently it was collected, e.g., to prioritize more recently collected feedback information over less recently collected feedback information.

A validity-deciding component 142 determines whether each segment should be assigned a final matched or unmatched status based on the first validation results 136 and the second validation results 140. In some cases, each of the validation results (136, 140) is binary in nature, providing a hard conclusion as to whether or not a route segment is considered matched. Here, in some implementations, the validity-deciding component 142 requires unanimous consensus among the separate validation processes before deeming a segment to be matched. That is, in the particular example of FIG. 1, the validity-deciding component 142 judges a segment as matched only if the first validation results 136 and the second validation results 140 confirm this conclusion. Alternatively, the validity-deciding component 142 uses majority voting to make a final decision, e.g., by deciding that a segment is matched if more than Z percent of the independent validation processes confirm this result (e.g., where Z is an environment-specific parameter, such as 50 percent in some cases).

In other examples, each of the validation results (136, 140) provides a probabilistic score, ranging from 0 percent to 100 percent, that expresses the probability that a segment under consideration is matched (or unmatched). In this case, the validity-deciding component 142 deems a candidate route matched based on any combination of these probabilistic scores. For example, the validity-deciding component 142 can normalize and then sum the probabilistic scores, or form a weighted sum of the normalized probabilistic scores, or form an average of the probabilistic scores, etc. The validity-deciding component 142 then compares the result of this combination, in whatever manner generated, with a prescribed threshold value to decide whether the segment under consideration is matched (and, as such, is likely free of prohibited maneuvers). In yet other cases, the validity-deciding component 142 uses any type of machine-trained model to transform the probabilistic validation results (136, 140) into a final score. The validity-deciding component 142 then compares the final score with a prescribed threshold.

In still other implementations, each of the validation results (136, 140) expresses a distribution of probabilistic scores, describing the likelihoods of different possible interpretations of each segment under consideration. A rules-based algorithm and/or machine-trained model processes the distributions to reach a final judgment as to whether or not a candidate segment should be tagged as matched or unmatched.

As a result of its processing, the validity-deciding component 142 stores information in a data store 144 regarding route segments that are matched and therefore likely to be free of prohibited movements. The stored information includes any information that identifies each segment (e.g., its segment ID) and any information that identifies the route to which the segment belongs (including total distance of the route, a time of departure, a trip duration, etc.). The validity-deciding component 142 stores information in a data store 146 regarding route segments that are unmatched, and therefore potentially contain prohibited maneuvers.

An optional manual review system 148 provides a platform by which a developer or other individual reviews segments that are tagged as unmatched (and optionally segments that are tagged as matched). In some implementations, the manual review system 148 displays information regarding a segment (or segments) under consideration. In some implementations, the manual review system 148 also provides a visual presentation of a region associated with the segment(s). For instance, the manual review system 148 presents an aerial image and/or satellite image of the region. The manual review system 148 also provides an interface tool that allows a user to classify the cause of the unmatched status of the segment(s) under consideration. As an outcome of the review process, the manual review system 148 confirms the status of at least one segment under consideration (e.g., as containing a prohibited maneuver) and/or changes the status of at least one segment (e.g., by changing it from unmatched to matched, or from matched to unmatched).

In some implementations, a correction system 150 makes changes to the routing system 104 to eliminate or reduce the severity of an identified cause of a prohibited maneuver. In other words, the correction system 1050 eliminates or reduces at least one factor that is causing generation of routes containing prohibited maneuvers. For example, assume that a segment is labeled as unmatched because it potentially contains a non-navigable roadway. Further assume that a developer or other individual determines that this error is due to the fact that the non-navigable roadway belongs to a military base, and is therefore not accessible to members of the public. The correction system 150 corrects this error by labeling the roadway in the engine routing network data as unavailable for public use. In other cases, the correction system 150 modifies the routing logic used by the routing engine 106 to generate routes. The correction system 150 can perform these tasks in a fully automated manner, partially automated manner, or fully manual manner. Additional details regarding the operation of the manual review system 148 and the correction system 150 are set forth below in Section D.

After changes made by the manual review system 148 and the correction system 150, the routing system 104 is subsequently used to guide users over a physical roadway network in a safer and more efficient manner (compared to a state of the routing system 104 prior to the revisions being made). That is, an end user interacts with the routing system 104 by input starting and ending locations of a journey, receiving a route produced by the routing system 104, and then following the route, e.g., using the vehicle 124 or other mode of transportation (bicycle, walking, etc.). The recommended route has a reduced chance of directing a user in an improper manner by virtue of the processes described herein. In some implementations, a user can interact with a navigation system (not shown) during traversal of the recommended route, which guides the user in following the recommended route based on real-time feedback provided by the position-measuring device 120, e.g., by directing the user when to make turns.

B. The GPS-Based Validating System

Figure 2:
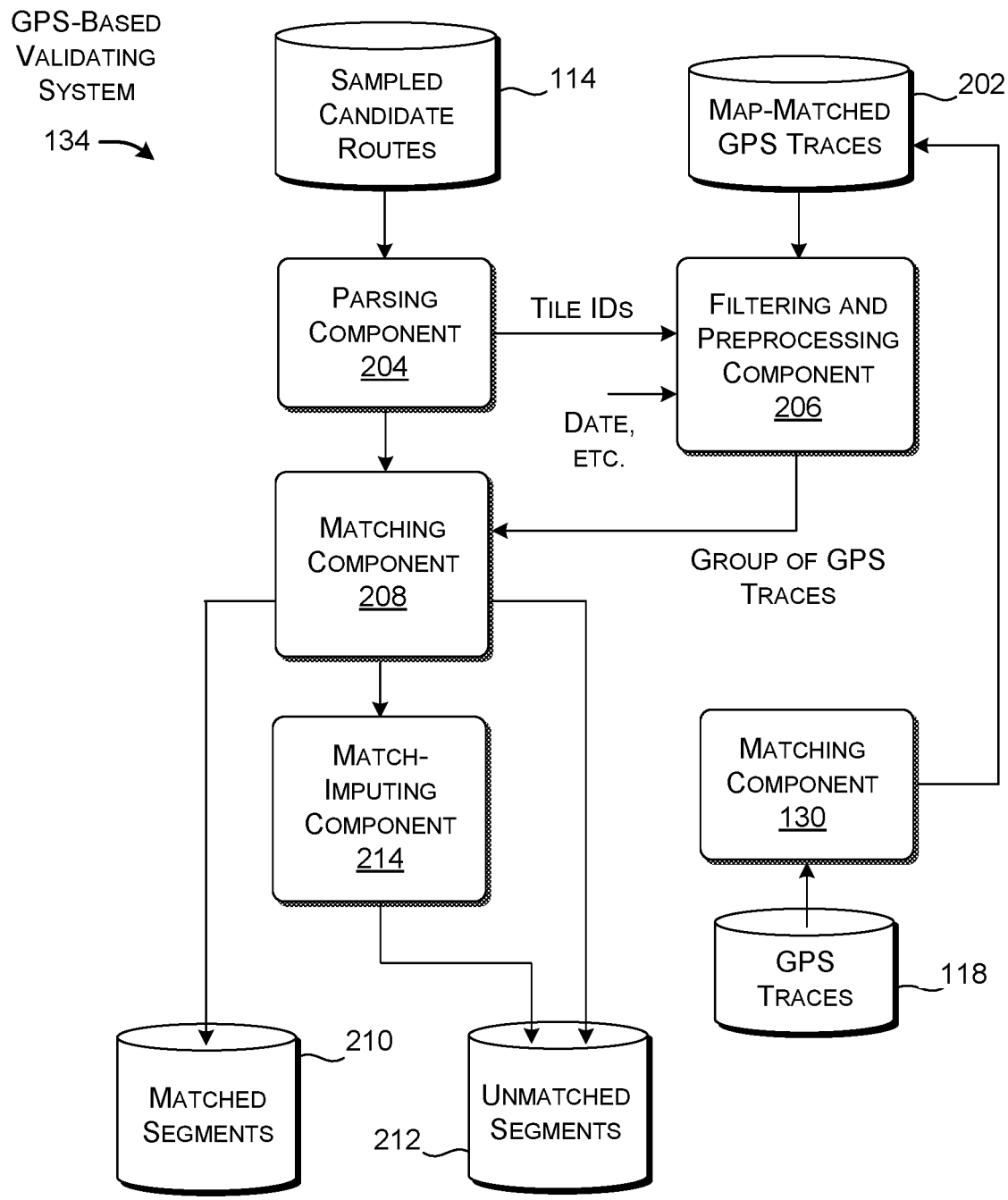
FIG. 2 shows a GPS-based validating system that the validity-testing system of FIG. 1 uses to validate a set of candidate routes based on a group of GPS traces.

FIG. 2 shows one implementation the GPS-based validating system 134 that compares the candidate routes with GPS traces. The data store 114 stores the candidate routes. The GPS traces represent map-mapped traces produced by the matching component 130. A data store 202 stores the map-matched traces (referred to as "GPS traces" below for simplicity).

A preliminary explanation will first be provided regarding the operation of the matching component 130. As explained above, the purpose of the matching component 130 is to "snap" the GPS measurements in the GPS traces provided by the GPS source 116 to the roads in the road network described in common map data, such as the routing-engine network used by the routing system 104 or any other map data that is defined as a base framework for comparison. A GPS measurement is snapped to a road by adjusting its position so that it lies on the road. This operation is appropriate because there is often a small spatial offset between a GPS measurement and map data due to noise in the GPS measurement, errors caused by the sampling rate of a position-measuring device, and/or inaccuracies in the map data. For the case in which the common map data is some data other than the routine-engine network data (used by the routing engine 104), the matching component 130 snaps both the candidate routes and the GPS traces to the common map data.

In one implementation, the matching component 130 snaps each position measurement to the nearest road segment in the common map data. In another implementation, the matching component 130 uses a Hidden Markov model (HMM) to map a sequence of position measurements to the most likely road segments in the common map data.

Figure 3:
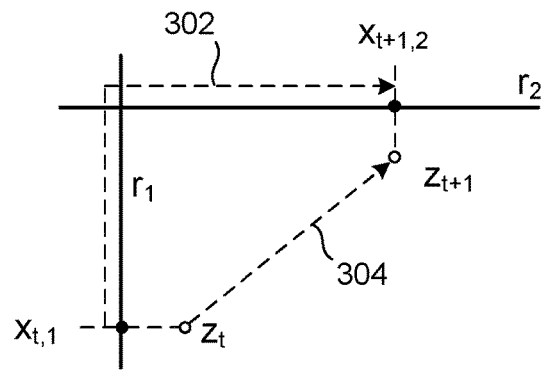
FIG. 3 is an example that illustrates one way in which the validity-testing system of FIG. 1 snaps (matches) GPS data to common map data.

Jumping ahead momentarily in the sequence of figures, FIG. 3 shows an example that explains one way in which the matching component 130 performs its function using HMM analysis. FIG. 3 specifically shows a first GPS measurement $z_t$ that occurs at time t, and a subsequent GPS measurement $z_{t+1}$ that occurs at time t+1. Assume that the first GPS measurement $z_t$ is closest to position $x_{t,1}$ that is located on a first route $r_1$, and that the second GPS measurement $z_{t+1}$ is closest to a position $x_{t+1,2}$ that is located on a second route $r_2$. (Routes $r_1$ and $r_2$ are part of a roadway network described by the common map data.) Assume that a route distance dr 302 separates the position $x_{t,1}$ from the position $x_{t+1,2}$, and that a great-circle distance $d_{gc}$ 304 separates the first GPS measurement $z_t$ from the second GPS measurement $z_{t+1}$. A route distance (route) describes how far the user must travel between $x_{t,1}$ and $x_{t+1,2}$ by traversing routes $r_1$ and $r_2$. A great circle distance (gc) reflects the shortest distance over the spherical surface of the earth.

The matching component 130 determines measurement probabilities (also called emission probabilities) for each possible state at each time. A state corresponds to a possibility that the user is traversing a particular route at a particular time, given a particular GPS measurement. More formally stated, a measurement probability $p(z_t|r_i)$ reflects the probability that, at the time that the vehicle records a GPS measurement $z_t$, it is traveling on a route $r_i$. In some implementations, the matching component 130 determines $p(z_t|r_i)$ using the following equation:

$$p(z_t|r_i) = \frac{1}{\sqrt{2\pi\sigma_z}} e^{-0.5\left(\frac{\|z_t - x_{t,i}\|_{gc}}{\sigma_z}\right)^2}. \quad (1)$$

In this equation, $\sigma_z$ is the standard deviation of the GPS measurements. $\|z_t - x_{t,i}\|_{gc}$ reflects the great circle distance between $z_t$ and the closest position on the route i. Equation (1) reflects the intuition that it becomes increasingly unlikely that a particular route matches a particular GPS measurement as the distance between that route and the GPS measurement grows larger. The matching component 130 interprets a set of initial state probabilities $\pi_i$ as the first-state measurement probabilities $p(z_1|r_1)$.

The matching component 130 also defines a plurality transition probabilities that describe the probabilities of transitioning between specified pairings of state. That is, a transition probability $p(d_t)$ describes the probability of transitioning from a first given state at time t to a second given state at time t+1. In some implementations, $d_t$ is given by:

$$d_t = \left|\|z_t - z_{t+1}\|_{gc} - \|x_{t,i} - x_{t+1,j}\|_{route}\right|. \quad (2)$$

The first difference component in Equation (2) reflects the great circle (gc) difference between $z_t$ and $z_{t+1}$. The second difference component in Equation (2) reflects the driving distance (route) between $x_{t,i}$ and $x_{t+1,j}$ on route $r_j$. Overall, Equation (2) computes the distances between the first (great circle) distance and the second (route) distance. In the example of FIG. 3, the distance de reflects the difference between the great circle distance 304 and the route distance 302. The probability $p(d_t)$ is given by:

$$p(d_t) = \frac{1}{\beta} e^{-d_t/\beta}. \quad (3)$$

The symbol $\beta$ represents a constant. In some implementations, the matching component 130 uses the Viterbi algorithm to find the most probable association between measurements and routes. That is, the Viterbi algorithm uses dynamic programming to find a path through a Viterbi lattice that maximizes the product of the measurement probabilities and the transition probabilities.

Returning to FIG. 2, to facilitate explanation, the operation of the GPS-based validating system 134 will be described with respect to processing performed for a single candidate route. However, in an actual implementation, the GPS-based validating system 134 can perform the operations described below in parallel for several candidate routes. In some implementations, each candidate route is expressed as a series of segment IDs that identify a series of segments in the candidate route. Each map-matched GPS trace (simply "GPS trace" below) is similarly expressed as a series of segment IDs that identify a series of one or more segments in the GPS trace. The segments in the candidate routes and the GPS traces are expressed with respect to the shared framework of the common map data. As will be explained below, the GPS-validating system 134 performs its comparison by comparing the segments of the candidate routes with the segments of the GPS traces.

A parsing component 204 identifies the tile ID(s) associated with each candidate route. These tile IDs identify geographical portions of a map that the candidate route passes through. The parsing component 204 also extracts maneuvers information that describe the maneuver(s) associated with the candidate route. For example, the maneuver information describes a maneuver point at which each maneuver occurs. The maneuver information also describes at least the entering route segment which precedes each maneuver point, and the exiting route segment which follows the maneuver point. The maneuver information also identifies the type of each maneuver. Some maneuver types reflect actions taken by a user on a route, such as a turning action. Other maneuvers reflect a change in the route itself along which the user travels. For example, consider a road that assumes a new name after a transition point, without the user making a turn. The name change is associated with a name-change maneuver, although this maneuver does not require any action by the user other than moving along the same physical roadway. In some implementations, the parsing component 204 represents each maneuver as a pair of segment IDs, which identify the entering and exiting segments associated with the maneuver. The GPS-based validating system 134 uses the above-described maneuver information in the second phase of its matching (described below).

A filtering component 206 generates a group of GPS traces that pass through the tiles associated with a candidate route under consideration. Alternatively, the filtering component 206 finds all GPS traces that are within a prescribed proximity to the path of the candidate route under consideration. In some implementations, the filtering component 206 also restricts the group of GPS traces to a specified temporal span, such as one week. Different temporal spans are appropriate depending on the objectives of the developer or other individual performing the testing. In a first case, the developer will choose an appropriately wide temporal span to encompass variations in traffic patterns and road conditions, and other variable factors. But the developer may also wish to limit the size of the span so that it does not include GPS traces that reflect outdated traffic patterns and road conditions. In other cases, a developer may wish compile a group of GPS traces that are targeted to a specific time of day, a specific day, or a particular season, etc.

A matching component 208 performs the actual task of matching the candidate route with the group of GPS traces. More specifically, in a first phase, the matching component 208 performs segment-to-segment matching. That is, the matching component 208 determines whether each segment of the candidate route is also found in the GPS traces (in a same time slot as the segment in the candidate route). The matching component 208 performs the first phase to collect data that is used to identify prohibited maneuvers associated with non-navigable route segments (referred to as NAV violations), and maneuvers associated with violations of one-way restrictions (referred to as OWR violations). For example, a candidate route that specifies navigation over a footpath or a non-existent roadway will not have any matching GPS traces, and therefore represents a NAV violation. A candidate route that specifies navigation in the wrong direction of a one-way street will similarly have few (if any) matching traces, and therefore represents an OWR violation.

In a second phase, the matching component 208 collects data that is used to identify violations associated with movement from one route leg to another route leg in a prohibited manner. The matching component 208 performs this task for each maneuver associated with the candidate route by performing segment-pair-to-segment-pair matching. That is, for a particular maneuver, the matching component 208 identifies the entering segment (which feeds into the maneuver point) and the exiting segment (which follows the maneuver point). The matching component 208 then determines whether this pair of consecutive segments is found in the group of GPS traces (in the appropriate time slots). At the end of the second phase, the matching component 208 selects only the output results that pertain to certain types of maneuvers, such as those pertaining to turn restrictions (e.g., left turns, right turns, U-turns, and roundabouts). Alternatively, the matching component 208 selects maneuvers of interest prior to performing segment-pair-by-segment-pair matching.

Based on the results of the above matching operation, the matching component 208 makes an environment-specific determination of the final matched/unmatched status of each segment under consideration. For example, with respect to the first phase, the matching component 208 determines whether each individual segment of the candidate route is found in a prescribed number of GPS traces. If so, the segment is considered matched; if not, the segment is considered unmatched. With respect to the second phase, the matching component 208 determines whether each pair of segments (which bracket a maneuver point) is found in a prescribed number of GPS traces. If so, the pair of segments and the associated maneuver is considered matched; if not, the pair of segments is considered unmatched. A data store 210 stores information regarding the matched segments (and segment pairs), and a data store 212 stores information regarding the unmatched segments (and segment pairs).

In other implementations, the matching component 208 indicates a weak match if a segment (or pair of segments) under consideration fails to match a first prescribed number N1 of GPS traces, but the segment (or pair of segments) is found in at least a second number N2 of GPS traces, where N1>N2. In other implementations, the GPS-based validating system 134 provides an output score for each segment (or pair of segments) under consideration that reflects the extent to which it matches a group of GPS traces, e.g., by specifying the number of GPS traces it matches, as appropriately normalized by a sample size. The validity-deciding component 142 of FIG. 1 can leverage this information in generating a probabilistic measure of the extent to which a segment is considered matched. The probability will increase with the number of matches.

A match-imputing component 214 revises the status of a segment in the candidate route from unmatched to match if certain conditions are met. A first implementation of the match-imputing component 214 is set forth below, followed by a description of possible variations of the first implementation. In a first phase of the first implementation, the match-imputing component 214 relabels the classification of an individual unmatched segment in the candidate route from unmatched to matched if the unmatched segment is preceded by a matched segment and following by a matched segment. In this case, the lack of matching GPS traces may be caused by insufficient sampling rates of some position-measuring devices and/or other noise-related factors. In a second phase, the match-imputing component 214 performs the same function described above, but in this case with respect to an unmatched pair of segments that are joined at a maneuver point. Here, the match-imputing component 214 changes the classification of a pair of unmatched segments from unmatched to matched if the entering segment which precedes the pair is a matched segment, and the exiting segment which follows the pair is also a matched segment. In other words, the imputation processing performed in the second phase is the same as the first phase, but, in the second phase, the unit of analysis is a pair of segments, rather than a single segment. The match-imputing component 214 updates the status of segments in the data store 212 for the segments having revised classification statuses.

As an additional safeguard, some implementations of the match-imputing component 214 specify two other conditions for an imputed match: a) each route segment in question must be less than or equal to a prescribed distance; and b) each route segment accommodates no mid-segment detours or other maneuvers. The definition of a segment (as corresponding to an edge between two intersections) satisfies this latter condition.

Figure 4:
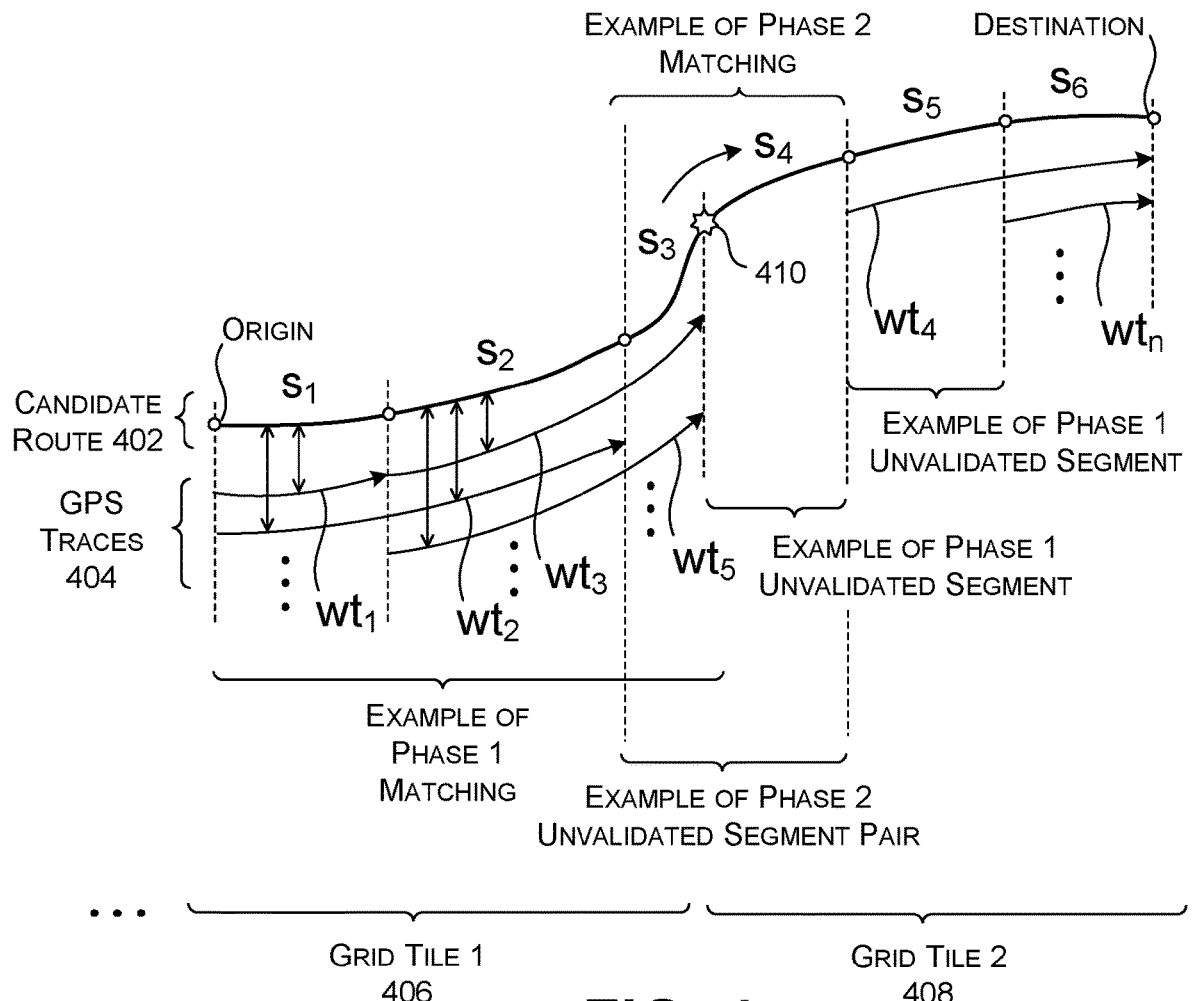
FIG. 4 is an example that shows one way in which the GPS-based validating system of FIG. 2 matches segments in a candidate route with GPS traces.

FIG. 4 shows one way in which the GPS-based validating system 134 of FIG. 2 matches segments in a candidate route 402 with a group of GPS traces 404. First, the parsing component 204 determines that the candidate route 402 spans two tiles: a first tile 406 and a second tile 408. The filtering component 206 identifies a group of GPS traces (i.e., the GPS traces 404) that overlap the two tiles (406, 408).

The matching component 208 then performs the above-described two-phase matching operation. In the first phase, the matching component 208 determines that the segment S1 (associated with time segment t1) is found in at least two GPS traces (with respect to the same time segment t1). Assume that the matching component 208 determines that this level of matching satisfies the test of the first phase. Similarly, assume that the matching component 208 concludes that segments S1, S2, S3 and S6 satisfy the test of the first phase.

The matching component 208 determines that segment S4 (associated with time slot t4) is found in no other GPS trace (in the same time slot). Assume that the matching component 208 therefore concludes that this segment fails to satisfy the test of the first phase. Assume that the matching component concludes that segment S5 similarly fails the test.

The match-imputing component 214 does not impute a first-phase match for segment S4 because the neighboring segment S5 is also an unmatched segment (recall that both segments which bracket an unmatched segment must be matching to impute a match). Similarly, the match-imputing component 214 does not impute a first-phase match for segment S5 because the neighboring segment S3 is unmatched. The segments S4 and S5 may represent NAV violations or OWR violations.

With respect to the second phase, assume that the parsing component 204 determines that the candidate route 402 includes at least one maneuver point 410, which lies between an entering segment (S3) and an exiting segment (S4). The matching component 208 determines that no GPS trace matches this sequence of segments in the same time slots; this must be case since no GPS trace includes the segment S4. Hence, the matching component 208 concludes that the segments S3 and S4 fail the test of the second phase. Assume that the match-imputing component 214 does not change the above conclusion because the neighboring exiting segment S5 of the pair is not found in a sufficient number of GPS traces. The segment-pair (S3, S4) may represent a turning violation (TR).

Other implementations of the GPS-validating system 134 vary the behavior of the match-imputing component 214 described above in one or more respects. For instance, in one variation of the first phase, the match-imputing component 214 takes into consideration: a profile of a particular unmatched segmented under consideration; a profile of a preceding group of one or more neighboring segments which occur directly before the particular unmatched segment; and a profile of a following group of one or more neighboring segments that directly follow the particular unmatched segment. A profile of the particular unmatched segment describes its characteristics, such as its type (e.g., indicating whether it describes a portion of a bridge roadway or tunnel), and the types of maneuvers that can be performed while traversing the particular unmatched segment. A profile of a group identifies the matched/unmatched status of each of the neighboring segments in the group, the type associated with each neighboring segment, the maneuver type(s) associated with each neighboring segment, and so on. The match-imputing component 214 makes a decision based on the profile of the particular unmatched segment, the profile of the preceding group, and the profile of the following group.

More specifically, in some implementations, the match-imputing component 214 makes a decision based on a set of rules. For example, one rule specifies instructs the match-imputing component 214 to form a preceding group that has a combined length of at least M meters, and a following group that has a combined length of at least M meters, where M is an environment-specific distance. The match-imputing component 214 considers the particular unmatched segment as matched if all the segments in the preceding group are matched and all of the segments in the following group are matched. Alternatively, the match-imputing component 214 considers the particular unmatched segment matched if a prescribed percentage of the segments in the preceding group are matched, and a prescribed percentage of the segments in the following group are matched. This rule reduces the chances that relatively short neighboring segments (e.g., 5 m long) will result in incorrect imputation decisions. The match-imputing component 214 can vary this illustrative rule for different road segment types. In other cases, the match-imputing component 214 uses a machine-trained classification model to map the above-described profiles into an indication of whether it is appropriate to impute a match for the particular unmatched segment under consideration.

The second phase of the operation of the match-imputing component 214 operates in a similar manner to that described above. Here, when analyzing a particular unmatched pair of segments, the match-imputing component 214 considers: the profile of the particular unmatched pair of segments, a profile of a preceding group of one or more neighboring segments that occur directly before the particular unmatched pair of segments, and a profile of a following group of one or more neighboring segments that directly follow the particular unmatched pair of segments. The composition of a "profile" is as described above.

C. Map-Based Validating System

Figure 5:
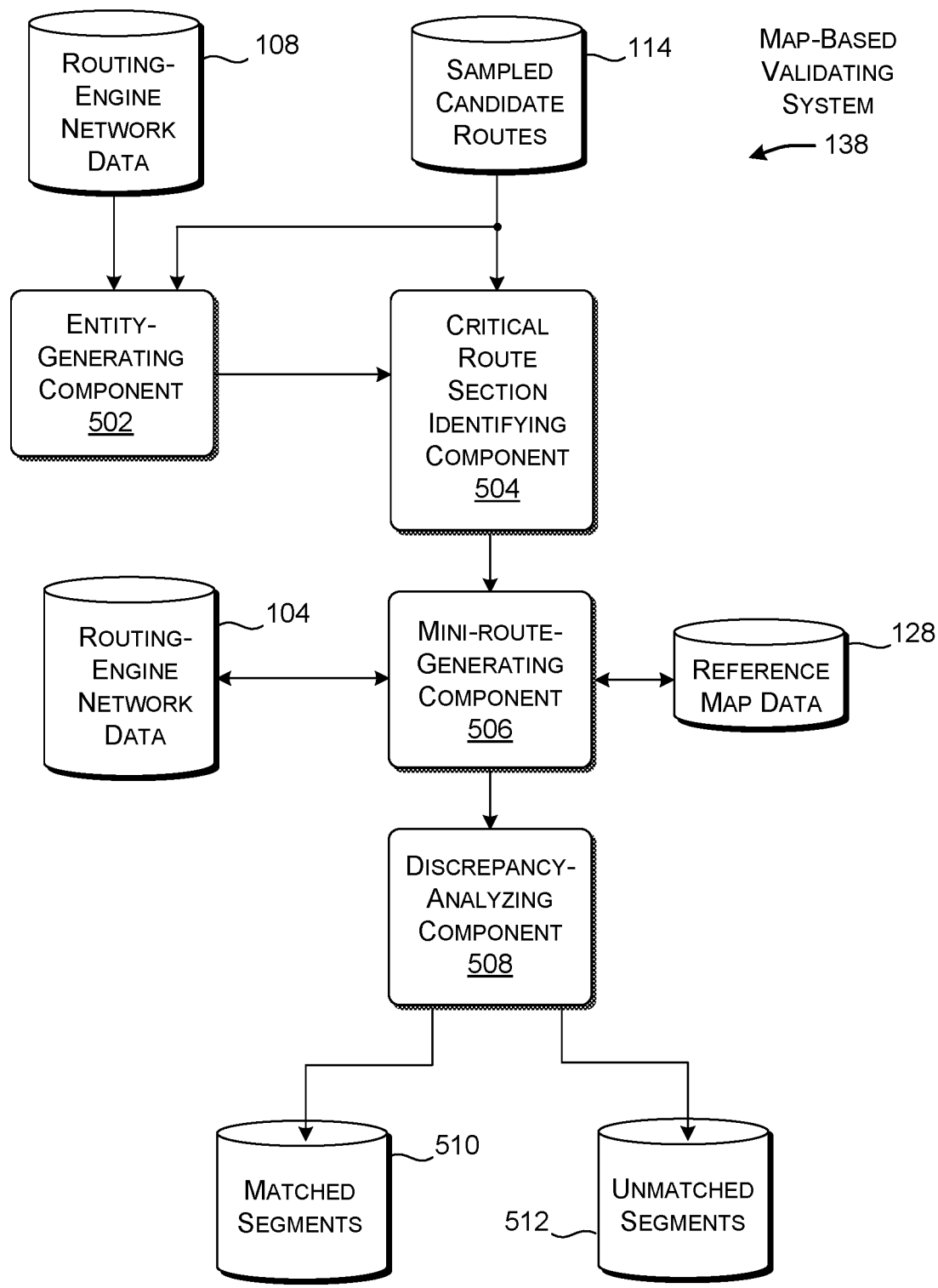
FIG. 5 shows a map-based validating system that the validity-testing system of FIG. 1 uses to validate the set of candidate routes based on reference map data.

FIG. 5 shows one implementation of the map-based validating system 138 that compares the candidate routes with the reference map data (such as the OSM data). The data store 114 stores the candidate routes. The data store 128 stores the reference map data. To facilitate explanation, the operation of the map-based validating system 138 will be explained with respect to processing performed for a single candidate route. However, in an actual implementation, the map-based validating system 138 can perform the operations described below in parallel for several candidate routes.

In one implementation, an entity-generating component 502 identifies route entities associated with the set of route candidates under consideration based on the routing-engine network data provided in the data store 108 (which the routing engine 104 uses to produce the candidate routes). A route entity is a set of one or more portions (e.g., segments) that share the same properties, and is separated by a neighboring route entity by a maneuver point of any type. The entity-generating component 502 assigns an entity ID to each detected route entity.

The map-based validating system 138 detects route entities for the following reason. Prohibited maneuvers often occur between two route entities. Therefore, as a precondition to detecting prohibited maneuvers, the entity-generating component 502 identifies route entities in the reference map data. For example, consider the case in which a candidate route specifies an improper turn from a first route leg (on a first road) to a second route leg (on a second road). As a precondition to detecting the improver turn, the entity-generating component 502 identifies the first route leg as a first route entity and the second route leg as a second route entity.

In some implementations, the entity-generating component 502 uses the following properties to identify route entities and to distinguish among different route entities: a) posted speed limit; b) road type (highway, alley, intersection, tunnel, bridge, etc.); c) directionality; d) number of lanes; e) whether driving is allowed; f) whether walking is allowed; g) road surface type (road, gravel, etc.); h) location information (country, region, zip code, etc.); i) geometric attributes (orientation, azimuth, etc.); j) road name; k) whether the driver drives on the left or right side of the road, etc. In some cases, a change in one of these properties marks a change of entities. For example, a road that changes its name transitions from a first entity to a second entity during the user's traversal of the route.

A critical route section-identifying component 504 uses the route entities identified by the entity-generating component 502 as a guide to find critical route sections in a candidate route under consideration. To find a critical route section, the critical route section-identifying component 504 first finds a maneuver point in the candidate route that: a) joins two neighboring route entities, and b) is associated with a particular kind of intersection, such as a right turn, a left turn, a U-turn, or a ramp-related turn. The critical route section-identifying component 504 then extracts the entering segment of the candidate route prior to the maneuver point, and the exiting segment of the candidate route after the maneuver point. This pair of segments in the candidate route defines a critical route section. The critical route section-identifying component 504 applies the above process to find all such critical route sections in each candidate route under consideration.

A mini-route-generating component 506 identifies two mini-routes between a first point of each critical route section and a last point of the critical route section. This corresponds to the first point in the entering segment prior to the maneuver point, and the last point in the exiting segment after the maneuver point. The mini-route-generating component 506 generates the first mini-route using the routing engine 106, based on the route-engine network data in the data store 108. The mini-route-generating component 506 generates the second mini-route using the routing engine 106, based on the map reference data provided in the data store 128. In some implementations, in the process of generating the mini-routes, the mini-route-generating component 506 snaps each mini-route to its underlying map data. For example, the mini-route-generating component 506 snaps the points in the first mini-route to the nearest roads in the routing engine network data, and the mini-route-generating component 506 snaps the points in the second mini-route to the nearest roads in the map reference data. There can be slight positional offsets between the same streets described by the routing engine network data and the map reference data. In other implementations, the mini-routine-generating component 506 snaps the two mini-routes to the same base map data, e.g., in the manner described above in Section B.

A discrepancy-analyzing component 508 determines whether the first mini route is substantially similar to the second mini-route. In one approach, the discrepancy-analyzing component 508 performs this task by generating a first boundary around the first mini-route and generating a second boundary around the second mini-route. The discrepancy-analyzing component 508 concludes that the boundaries of the two mini-routes overlap by a prescribed environment-specific amount (e.g., 90 percent). In other cases, the discrepancy-analyzing component 508 demands that the second mini-route lie entirely within the first boundary, and the first mini-route lie entirely within the second boundary. If the matching condition specified by the discrepancy-analyzing component is met, then the map-based validating system 138 designates the entering and exiting segments as matched segments. Otherwise, the map-based validating system 138 designates the entering and exiting segments as unmatched segments, and the maneuver point between these two segments as a prohibited maneuver. A data store 510 stores matched segments, and a data store 512 stores unmatched segments.

Figure 6:
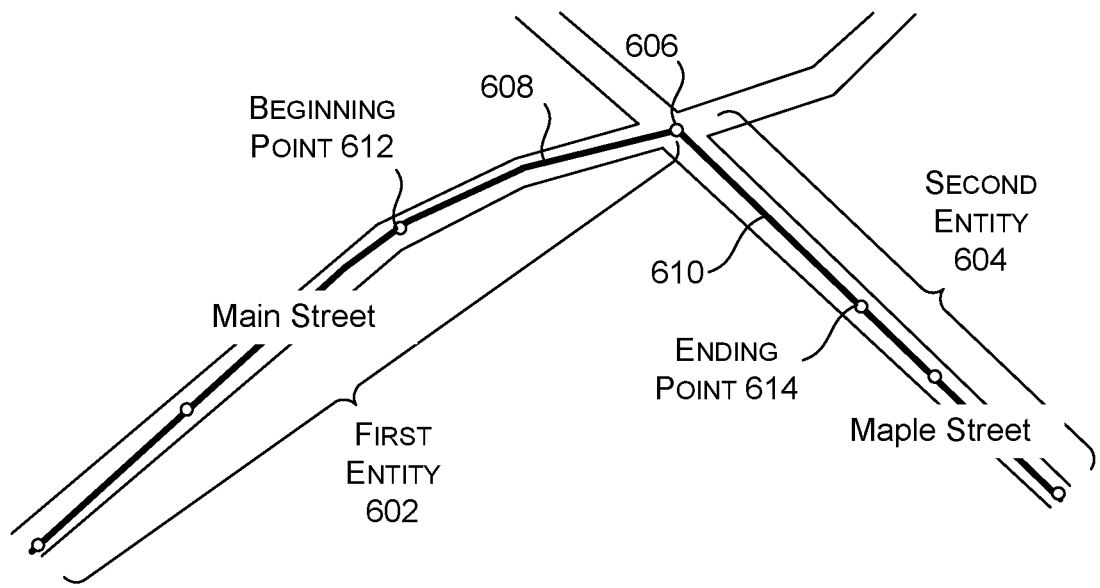
FIG. 6 is an example that shows a pair of route entities identified by the map-based validating system of FIG. 5.

FIG. 6 shows an example of the operation of the entity-generating component 502 and the critical route section-identifying component 504 of the map-based validating component 138. Assume that the entity-generating component 502 identifies two route entities (602, 604) associated with the two route legs that meet at a common maneuver point 606. The candidate route directs a driver to make a left turn onto the second route leg when reaching the maneuver point 606 from the first route leg.

The critical route section-identifying component 504 produces a critical route section that includes an entering segment 608 just prior to the maneuver point 606, and an exiting segment 610 immediately after the maneuver point 606. More specifically, the critical route section begins at a first point 612 of the entering segment 608 and ends at a last point 614 of the ending segment 610.

Figure 7:
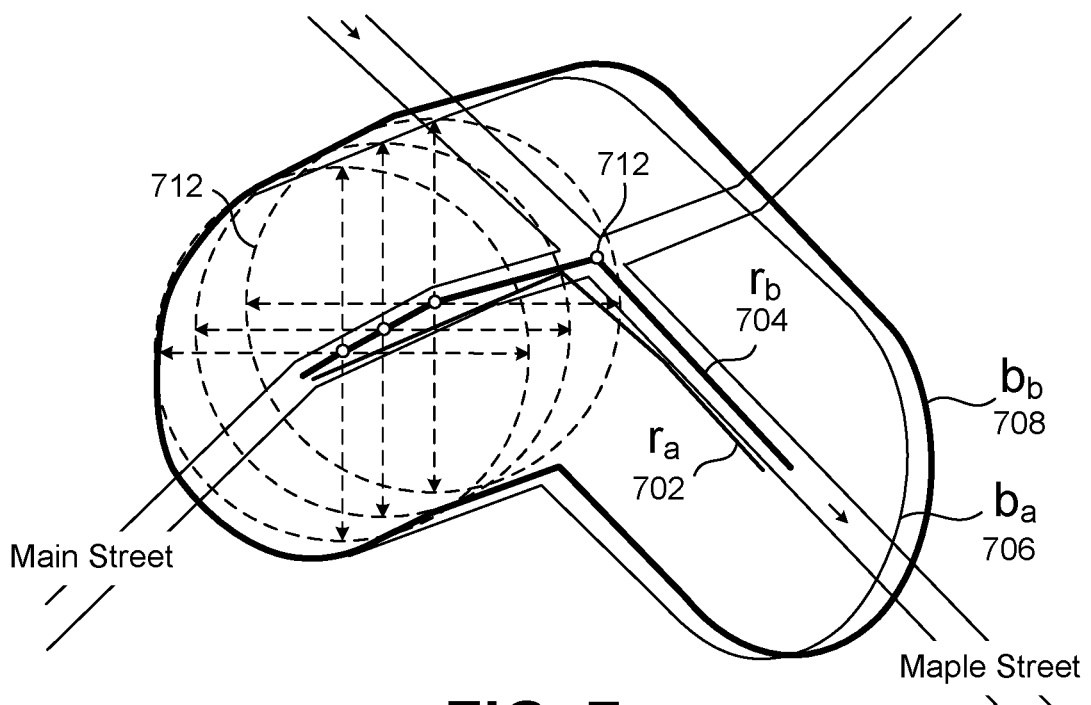
FIG. 7 is an example that shows one way of determining whether two mini-routes produced by the map-based validating system (of FIG. 5) are deemed to match each other.

FIG. 7 shows an example of the operation of the mini-route-generating component 506 and the discrepancy-analyzing component 508. Assume that the mini-route-generating component 506 generates a first mini-route ra 702 based on the routing-engine network data, and a second mini-route rp 704 based on the reference map data. The discrepancy-analyzing component 508 generates a first boundary ba 706 around the first mini-route 702, and a second boundary bp 708 around the second mini-route 704. In some implementations, the discrepancy-analyzing component 508 generates the boundaries (706, 708) by moving a geometrical shape (e.g., a circle 710 with a radius having a prescribed length) along each mini-route. The outermost sweep of the circle defines the boundary. In the case of FIG. 7, the discrepancy-analyzing component 508 concludes that the first mini-route 702 is entirely enclosed in the second boundary 708, and the second mini-route 704 is entirely enclosed in the first boundary 706. Based on this finding, the discrepancy-analyzing component 508 concludes that the segments associated with the mini-routes are matched, and a maneuver point 712 between the two route entities represents a valid maneuver. In some implementations, the discrepancy-analyzing component 508 creates the type of geographic boundaries shown in FIG. 7 using the SQL geometry stbuffer feature.

Figure 8:
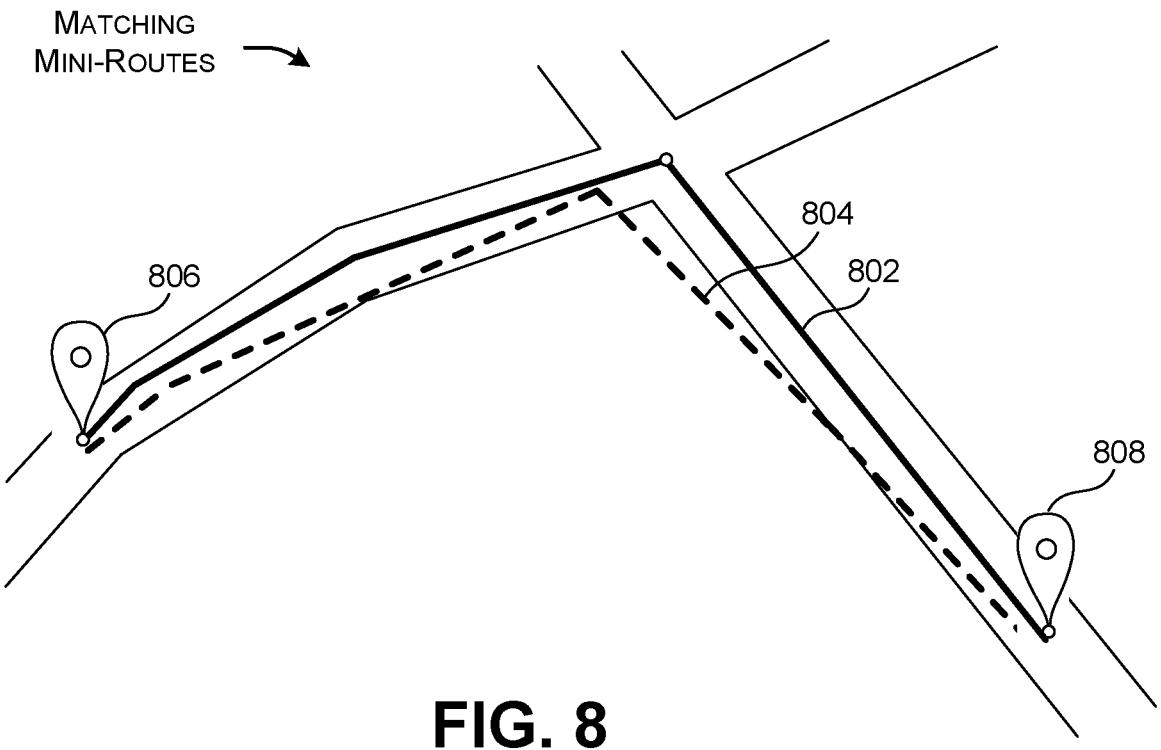
FIG. 8 is an example that shows a matching pair of mini-routes identified by the map-based validating system of FIG. 5.
Figure 9:
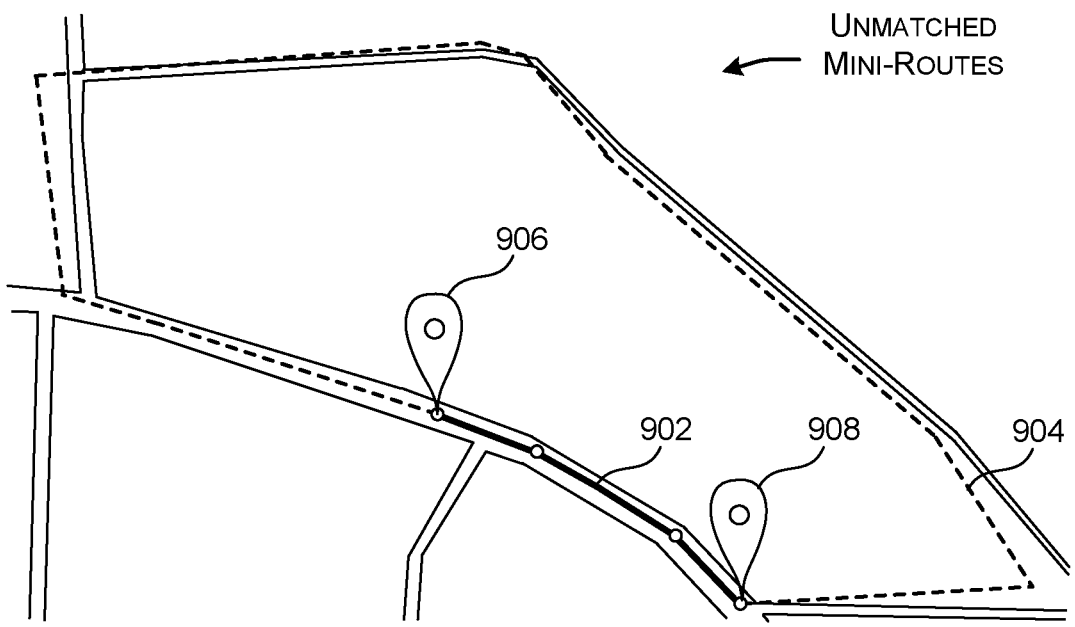
FIG. 9 is an example that shows two non-matching mini-routes identified by the map-based validating system of FIG. 5.

FIG. 8 shows an example of mini-routes (802, 804) that match, each traversing a path between a starting point 806 and an ending point 808. Note, however, that there is a slight positional offset between the two mini-routes (802, 804) because the mini-routes (802, 804) are snapped to the roads described by two different instances of map data (that is, the routing-engine network data and the reference map data). The positional offset is generally small and thus does not override the conclusion that the two mini-routes (802, 804) match. FIG. 9 shows an example of mini-routes (902, 904) that do not match. Each mini-route traverses a path between a starting point 906 and an ending point 908. It is evident in this example that the two mini-routes (902, 904) use different roads to connect the starting point 906 and the ending point 908.

Other implementations of the map-based validation system 138 vary the above-described behavior in one or more respects. For example, in a second implementation, the entity-generating component 502 snaps the candidate routes to the map reference data, e.g., using the same process described above in Section B. The entity-generating component 502 then identifies the entities based on the snapped candidate routes (using the map reference data). The remainder of the processing flow described above for the first implementation remains the same. Note that the entities produced based on the map reference data (for the second implementation) will generally differ from the entities produced based on the routing-engine network data (for the first implementation) because these two map sources will not agree in all respects. Likewise, the mini-route endpoints produced by the second implementation can vary from the mini-route endpoints of the first implementation.

D. Post-Processing Components

Figure 10:
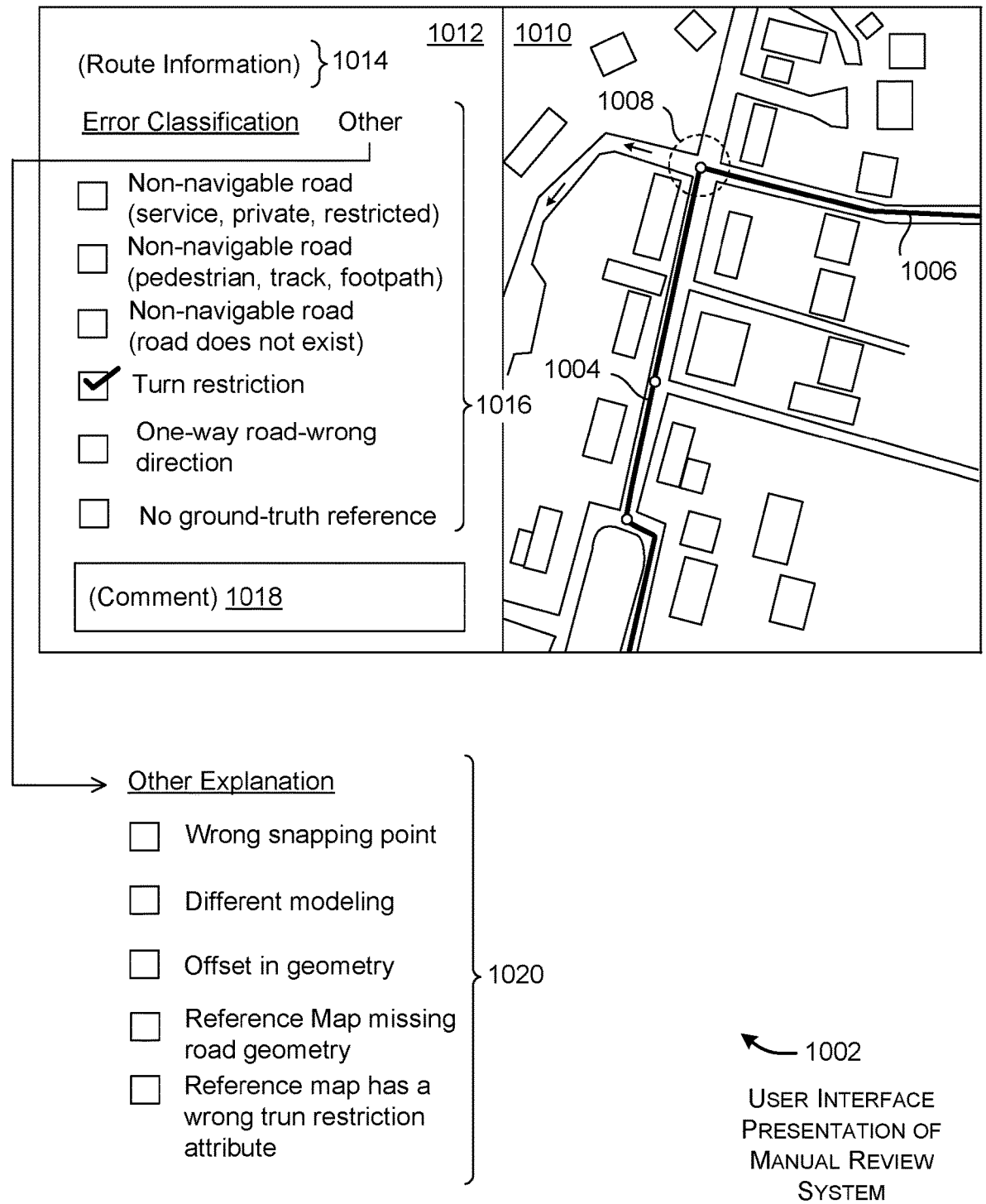
FIG. 10 shows a presentation generated by the validity-testing system of FIG. 1, which enables a developer or other individual to manually review an identified prohibited maneuver.

FIG. 10 shows an illustrative user interface presentation 1002 produced by the manual review system 148 for a particular pair of segments in a candidate route that labeled as unmatched. Being unmatched, these segments potentially exhibit a prohibited maneuver. Assume that the route section in question includes a pair of route portions including an entering route portion 1004 and an exiting route portion 1006, which meet at a maneuver point 1008. Here, the maneuver point 1008 is a right turn onto the route portion 1006 from the route portion 1004. A first presentation section 1010 presents a street-level aerial image and/or a street-level satellite image of the segments under review. A second presentation section 1012 presents information 1014 regarding the potential prohibited maneuver. The second presentation section 1012 also provides an interface tool that guides the user in diagnosing the cause of the unmatched status of the segments.

More specifically, the second presentation section 1012 presents a list of possible causes 1016, all based on the assumption that the segments contain a prohibited maneuver. A user selects a cause (or causes) by activating a radio button control feature (or other type of control feature) associated with the applicable entry(ies) in the list of possible causes 1016. Alternatively, or in addition, the user enters a free-form commentary in a text field 1018.

In some implementation, the possible causes are: 1) presence of a first class of non-navigable roads, including any of a service road, a private road, a restricted area, an airport road, a military area, etc.; 2) presence of a second class of non-navigable roads, including any of a pedestrian walkway, a track, a footpath, etc.; 3) presence of a third class of non-navigable roads representing a finding that the suggested road does not exist; 4) presence of a turn restriction attributed to a sign that posts the restriction, a gate that prevents a suggested turn, another type of barrier that prevents a suggested turn, etc.; 5) presence of a one-way road restriction that is contrary to a suggested route instruction; 6) a finding that there is no ground-truth which enables a user to confirm or deny a potentially prohibited maneuver, and so on.

In the example shown in FIG. 10, the image in the first presentation section 1010 indicates that the user has been instructed to make a turn onto a one-way street in the wrong direction. Upon recognizing this error, the user will select the entry in the list of possible causes 1016 associated with a one-way road violation.

In other cases, the segment(s) in question are flagged as unmatched because they significantly vary from at least one reference source, such as the reference map data. However, the flagged segment(s) are in fact proper (error-free). The second presentation section 1012 presents another list of possible causes 1020 that guide the user in diagnosing the source of this type of discrepancy. In some implementations, these causes include: 1) a finding that the routing system 104 snapped to an incorrect road; 2) a finding that the routing system 104 and the reference map source 126 use different modeling (e.g., different algorithms and/or machine-trained models) to produce the routing-engine network data and the map reference data, respectively; 3) a finding that the routing system 104 and the reference map source 126 use the same modeling, but that there is a geometry offset between the road network data used by these sources; 4) a finding that the reference map data is missing a road and/or other map feature; 5) a finding that the reference map data has an incorrect turn restriction attribute, and so on.

From a more general perspective, the user's selection of an entry in the first list of possible causes 1016 reflects a conclusion that an unmatched status is TRUE. The user's selection of an entry in the second list of possible causes 1020 reflects a conclusion that an unmatched status is FALSE (and therefore the status should be changed to matched). In other cases, the user interface presentation 1002 enables a user to directly input this conclusion, e.g., by clicking on TRUE or FALSE options presented by the user interface presentation 1002.

The validity-testing system 102 of FIG. 1 produces one or more summary metrics that reflect its final conclusions. These conclusions are sample-based because they are produced based on analysis of samples (e.g., the candidate routes and the GPS traces). In some implementations, the validity-testing system 102 produces a route legality score (Route Legality) that measures the percentage of candidate routes having at least one prohibited maneuver.

$$\text{Route Legality} = \frac{R_{prohibited}}{R_{Total}} \times 100. \tag{4}$$

In equation (4), $R_{prohibited}$ is the number of detected prohibited candidate routes (with at least one prohibited maneuver) and $R_{Total}$ is the total number of candidate routes that were analyzed.

In addition, the validity-testing system 102 provides an illegality metric a that provides a measure of the average number of prohibited maneuvers in the candidate routes:

$$\alpha = \frac{1}{R_{Total}} \cdot \sum_{i=1}^{R_{Total}} m_{r_i}. \tag{5}$$

In this equation, $m_{r_i}$ denotes the number of prohibited maneuvers in a particular candidate route i. Overall, a depends on the sample size and is expected to be very low for a large number of candidate routes. With a fixed sample size, this measure conveys a sense of the absolute number of prohibited maneuvers per candidate route in the sample set.

Equation (5) can be modified to produce measures for different types of prohibited maneuvers, where t refers to a particular type of prohibited maneuver:

$$\alpha_t = \frac{1}{R_{Total}} \cdot \sum_{i=1}^{R_{Total}} m_{t, r_i}. \tag{6}$$

Other metrics can be used, in addition to the metrics described above and/or in place of the metrics described above. Other metrics, for instance, describes the number of prohibited maneuvers by driven distance, by duration, by road type (arterial road, highway, etc.), etc., or any combination thereof.

Figures 11, 12:
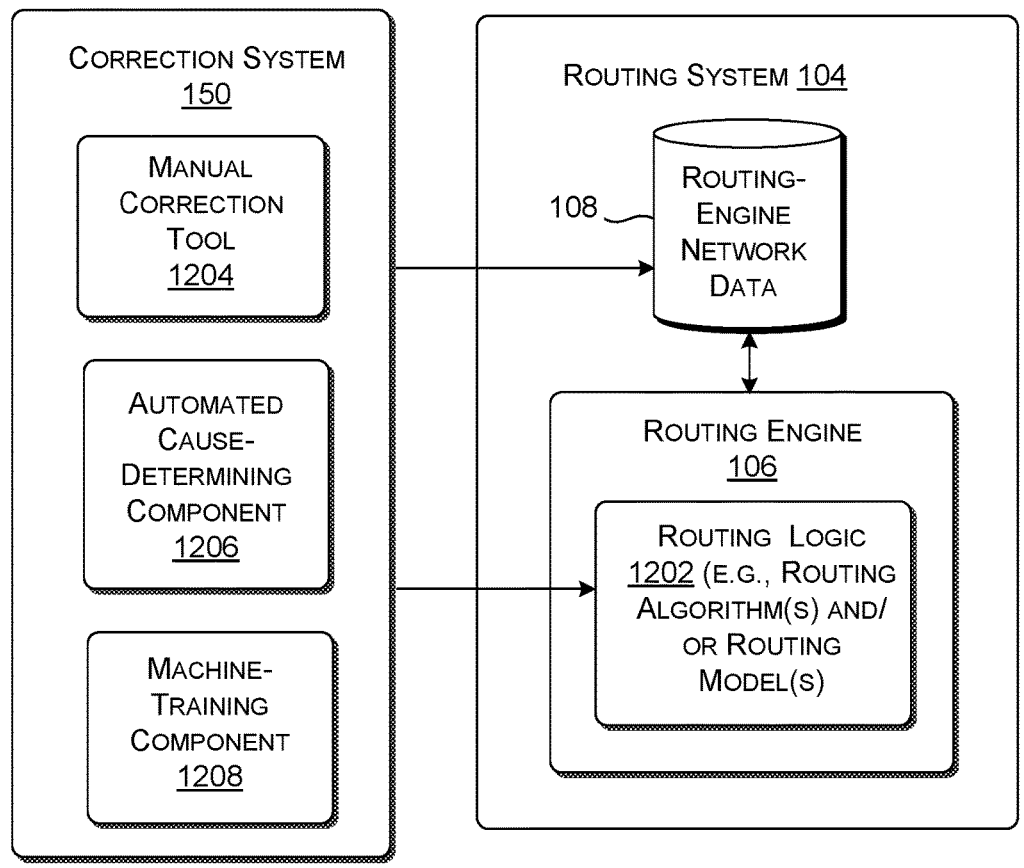
FIG. 11 is a chart that compares the performance of the validity-testing system of FIG. 1 with alternative techniques.
FIG. 12 shows one implementation of a correction system, which is another component of the validity-testing system of FIG. 1.

FIG. 11 is a chart that compares the performance of the validity-testing system 102 of FIG. 1 with alternative techniques. That is, the columns of the chart pertain to different techniques. A first column of the chart provides a ground-truth assessment of prohibited maneuvers in candidate routes, e.g., as manually provided by experts and/or other trusted sources. A second column provides results for the case in which just the reference map data is used to analyze the candidate routes. A third column provides results for the case in which just the GPS traces are used to analyze the candidate routes. A fourth column provides results for the case in which a two-staged funnel approach is used to analyze the candidate routes, with the GPS traces being used in the first stage and the map reference data being used in the second stage. A last column reflects the results provided by the validity-testing system 102 of FIG. 1, which performs independent confirmation using the GPS traces and the map reference data.

The different rows provide different measures of performance. The first row, for instance, provides Route Legality scores for the different techniques, e.g., as given by Equation (4). The remaining rows provide scores for different types of prohibited maneuvers, with respect to the different techniques. More specifically, in this section of the chart, each number in parenthesis, e.g., (n), represents the total number of detected prohibited maneuvers of a particular type for a particular technique. Each percentage in the chart represents the ratio of the total number of analyzed candidate routes that contain a prohibited maneuver to the total number of analyzed candidate routes.

Note that the technique used by the validity-testing system 102 of FIG. 1 generally performs the best in accurately detecting prohibited maneuvers. The validity-testing system 102 specifically excels over the other techniques in detecting prohibited turns. One factor that enables the validity-testing system 102 to reduce false negatives is its double-validation strategy which requires a candidate route to pass two independent tests to be declared free of prohibited maneuvers.

Note, however, that the technique used by the validity-testing system 102 has a lower coverage than the other techniques. For example, in one study, the validity-testing system 102 successfully classified 86 percent of the total number of candidate routes without human assistance, whereas the reference map-only technique was able to automatically classify 88.9 percent of the candidate routes, the GPS trace-only technique was able to automatically classify 96.7 percent of the total number of candidate routes, and the two-stage approach (GPS-reference map) was able to automatically classify 99.6 percent of the total candidate routes. This superior coverage, however, is counterbalanced by the fact that these alternative techniques produce more false negatives than the validity-testing system 102, and therefore provide lower-quality results. In some cases, false negative are caused by misleading GPS traces and/or incorrect reference map data. Remedying these false negatives is labor intensive and resource intensive, thus reducing or eliminating the apparent time-saving benefits of the alternative techniques having high coverages.

For the special case of the two-stage approach (GPS→reference map), this technique is comparatively less successful than the validity-testing system 102 because it requires a very precise map-matched GPS dataset, and update-to-date and high-quality reference map data. This is a difficult dual-demand to satisfy in many cases.

FIG. 12 shows one implementation of the correction system 150. As previously stated, the correction system 150 eliminates or reduces causes of prohibited maneuvers that have been detected, or at least makes changes that reduce their frequency of occurrence. In some cases, the correction system 150 makes changes to the routing-engine network data in the data store 108.

Alternatively, or in addition, the correction system 150 modifies routing logic 1202 that the routing system 104 uses to generate routes. This routing logic 1202 includes one or more routing algorithms and/or one or more machine-trained models. Examples of routing algorithms include Dijkstra's algorithm, the A* algorithm, the Floyd-Warshall algorithm, Johnson's algorithm, the Customizable Route Planning (CRP) algorithm (described, for instance, in DELLING, et al., "Customizable Route Planning," in Proceedings of the 10th International Symposium on Experimental Algorithms, (SEA'11), May 2011, 12 pages), and so on. Machine-trained models for assisting in the task of route planning include various supervised techniques and reinforcement learning techniques, e.g., as described in Bogyrbayevay, et al., "Learning to Solve Vehicle Routing Problems: A Survey," arXiv, arXiv: 2205.02453v1 [cs.LG], May 5, 2023, May 2022, 21 pages. This is a non-exhaustive list; other implementations use yet other types of routing technology. One commercially available routing system is provided by BING MAPS, provided by Microsoft Corporation of Redmond, Washington.

A manual correction tool 1204 provides a user interface presentation that enables the user to change the routing-engine network data in the data store 108, e.g., by adding an edge associated with a missing route portion, adjusting the position of an existing edge, modifying an attribute associated with a vertex or an edge, or adding a new attribute. Alternatively, or in addition, the manual correction tool 1204 enables the user to change one or more operating parameters of the routing logic 1202, e.g., by adjusting a hyper-parameter of a machine-trained model or an algorithm.

An automated cause-determining component 1206 automatically determines a cause of a detected prohibited maneuver, and then corrects the prohibited maneuver. In doing so, the automated cause-determining component 1206 replaces or supplements the use of the manual review system 148. Consider the example shown in FIG. 10. The automated cause-determining component 1206 applies a rule that states: a) IF the prohibited maneuver is associated with an intersection; AND b) IF the route to which the user is instructed to turn is a one-way street; AND c) IF the GPS traces indicate that traffic flows on the one-way street in an opposite direction to that which is instructed; THEN d) designate the cause of the unmatched segments as a one-way route violation; AND e) change the attribute of this street in the routine-engine network data to reflect the correct direction of traffic flow. The automated cause-determining component 1206 includes other IF-THEN rules to handle other types of prohibited maneuvers. In other implementations, the automated cause-determining component 1206 uses a machine-trained classification model of any type to classify the cause of the unmatched status of one or more segments.

A machine-training component 1208 adds each detected prohibited maneuver as a training example to a corpus of training examples. For example, the training example specifies: a) information that describes the candidate route; b) information that describes the outcome of analysis performed by the validity-testing system 102; and, optionally c) a manually-specified or automatically-determined cause of any detected prohibited maneuver. Upon accumulating a prescribed number of new training examples, the machine-trained component 1208 retrains a machine-trained model used by the routing logic 1202, e.g., using stochastic gradient descent in combination with back projection.

Section E. Illustrative Processes

FIGS. 13-16 show four processes that represent an overview of the operation of the validity-testing system 102 of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 17 and 18.

More specifically, FIG. 13 shows a process 1302 for identifying and resolving prohibited maneuvers in routes generated by a routing system (e.g., the routing system 104). The method includes: receiving (in block 1304) a set of candidate routes produced by the routing system using routing-engine network data, the set of candidate routes having different starting and ending locations (at least in part); receiving (in block 1306) first route-related validation data from a first source (e.g., the GPS source 116); receiving (in block 1308) second route-related validation data from a second source (e.g., the reference map source 126); producing (in block 1310) first validation results by comparing the set of candidate routes with the first route-related validation data; producing (in block 1312) second validation results by comparing the set of candidate routes with the second route-related validation data; identifying (in block 1314) prohibited maneuvers in the set of candidate routes that are independently confirmed by both the first validation results and the second validation results; and revising (in block 1316) the routing system to eliminate or reduce at least one factor that is causing generation of routes containing the prohibited maneuvers identified in the determining. The routing system 104, as revised, is subsequently used to guide users over a physical roadway network in a safer and more efficient manner (compared to a state of the routing system 104 prior to the revisions being made). A navigation system (not shown) can provide real-time guidance to a user during traversal of a recommended route.

FIG. 14 shows another process 1402 for identifying and resolving prohibited maneuvers in routes generated by a routing system (e.g., the routing system 104). The process 1402 may be viewed as a particular case of the process 1302 of FIG. 13. The process 1402 includes: receiving (in block 1404) a set of candidate routes produced by the routing system using routing logic (e.g., the routing logic 1202) that operates on routing-engine network data, the set of candidate routes having different starting and ending locations; receiving (in block 1406) a collection of traces measured by position-determining devices as the position-determining devices traverse actual routes; receiving (in block 1408) reference map data; producing (in block 1410) first validation results by comparing the set of candidate routes with the collection of traces; producing (in block 1412) second validation results by comparing the set of candidate routes with the reference map data; determining (in block 1414) prohibited maneuvers in the set of candidate routes that are independently confirmed by both the first validation results and the second validation results; and revising (in block 1416) the routing-engine network data and/or the routing logic of the routing system to eliminate or reduce at least one factor that is causing generation of routes containing the prohibited maneuvers identified in the determining.

FIG. 15 shows a process 1502 performed by the GPS-based validating system 134. In this context, assume that the first route-related validation data is a collection of traces measured by position-determining devices as the position-determining devices traverse actual routes. The process 1502 includes: identifying (in block 1504) a group of traces within a prescribed geographic proximity to a particular candidate route; determining (in block 1506) whether a particular segment of the particular candidate route is found in at least a first prescribed number of traces in the group of traces, at a same time at which the particular segment occurs; identifying (in block 1508) a pair of segments in the candidate route that is joined at a maneuver point associated with a maneuver; and determining (in block 1510) whether the pair of segments in the particular candidate route is found in at least a second prescribed number of traces in the group of traces, at a same time at which the pair of segments occurs.

FIG. 16 shows a process 1602 performed by the map-based validating system 138. In this context, assume that the second route-related validation data is reference map data. The process 1602 includes: identifying (in block 1604) a set of route entities in the routing-engine network data or the reference map data, each route entity describing a route portion having common properties; based the set of route entities that are identified, identifying (in block 1606) a pair of neighboring route entities in a particular candidate route that are joined at a maneuver point associated with a maneuver, the two neighboring route entities having a first neighboring route entity and a second neighboring route entity; identifying (in block 1608) a first mini-route, using the routing-network network data, between a beginning point of the first neighboring route entity and an ending point in the second neighboring route entity; identifying (in block 1610) a second mini-route, based on the map reference data, between the beginning point of the first neighboring route entity and the ending point of the second neighboring route entity; and determining (in block 1612) whether the first mini-route matches the second mini-route.

Section F. Illustrative Computing Functionality

FIG. 17 shows computing equipment 1702 that, in some implementations, is used to implement the validity-testing system 102 of FIG. 1. The computing equipment 1702 includes a set of local devices 1704 coupled to a set of servers 1706 via a computer network 1708. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1708 is implemented as a local area network, a wide area network (e.g., the Internet), one or more point-to-point links, or any combination thereof.

The bottom-most overlapping box in FIG. 17 indicates that the functionality of the validity-testing system 102 is capable of being spread across the local devices 1704 and/or the servers 1706 in any manner. For instance, in some cases, each local device, or a group of affiliated local devices, implements the entirety the validity-testing system 102. In other implementations, the servers 1706 implement the entirety of the validity-testing system 102. Here, an individual user (e.g., a developer) interacts with the servers 1706 via a browser application or other local functionality provided by a local device. In other implementations, the functions of the validity-testing system 102 are distributed between each local device and the servers 1706. For example, in one case, the servers 1706 implement one or more data-intensive validation processes, and each local device implements the remainder of the validity-testing system 102.

FIG. 18 shows a computing system 1802 that, in some implementations, is used to implement any aspect of the mechanisms set forth in the above-described figures. For instance, in some implementations, the type of computing system 1802 shown in FIG. 18 is used to implement any local computing device or any server shown in FIG. 17. In all cases, the computing system 1802 represents a physical and tangible processing mechanism.

The computing system 1802 includes a processing system 1804 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), and/or one or more Tensor Processing Units (TPUs), etc. More generally, any processor corresponds to a general-purpose processing unit or an application-specific processor unit.

The computing system 1802 also includes computer-readable storage media 1806, corresponding to one or more computer-readable media hardware units. The computer-readable storage media 1806 retains any kind of information 1808, such as machine-readable instructions, settings, model weights, and/or other data. In some implementations, the computer-readable storage media 1806 includes one or more solid-state devices, one or more magnetic hard disks, one or more optical disks, magnetic tape, etc. Any instance of the computer-readable storage media 1806 uses any technology for storing and retrieving information. Further, any instance of the computer-readable storage media 1806 represents a fixed or removable unit of the computing system 1802. Further, any instance of the computer-readable storage media 1806 provides volatile and/or non-volatile retention of information.

More generally, any of the storage resources described herein, or any combination of the storage resources, is to be regarded as a computer-readable medium. In many cases, a computer-readable medium represents some form of physical and tangible route entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1802 utilizes any instance of the computer-readable storage media 1806 in different ways. For example, in some implementations, any instance of the computer-readable storage media 1806 represents a hardware memory unit (such as random access memory (RAM)) for storing information during execution of a program by the computing system 1802, and/or a hardware storage unit (such as a hard disk) for retaining/archiving information on a more permanent basis. In the latter case, the computing system 1802 also includes one or more drive mechanisms 1810 (such as a hard drive mechanism) for storing and retrieving information from an instance of the computer-readable storage media 1806.

In some implementations, the computing system 1802 performs any of the functions described above when the processing system 1804 executes computer-readable instructions stored in any instance of the computer-readable storage media 1806. For instance, in some implementations, the computing system 1802 carries out computer-readable instructions to perform each block of the processes described in with reference to FIGS. 13-16. FIG. 18 generally indicates that hardware logic circuitry 1812 includes any combination of the processing system 1804 and the computer-readable storage media 1806.

In addition, or alternatively, the processing system 1804 includes one or more other configurable logic units that perform operations using a collection of logic gates. For instance, in some implementations, the processing system 1804 includes a fixed configuration of hardware logic gates, e.g., that are created and set at the time of manufacture, and thereafter unalterable. In addition, or alternatively, the processing system 1804 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1804 effectively incorporates a storage device that stores computer-readable instructions, insofar as the configurable logic units are configured to execute the instructions and therefore embody or store these instructions.

In some cases (e.g., in the case in which the computing system 1802 represents a user computing device), the computing system 1802 also includes an input/output interface 1814 for receiving various inputs (via input devices 1816), and for providing various outputs (via output devices 1818). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1820 and an associated graphical user interface presentation (GUI) 1822. The display device 1820 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1802 also includes one or more network interfaces 1824 for exchanging data with other devices via one or more communication conduits 1826. One or more communication buses 1828 communicatively couple the above-described units together.

The communication conduit(s) 1826 is implemented in any manner, e.g., by a local area computer network, a wide area computer network (e.g., the Internet), point-to-point connections, or any combination thereof. The communication conduit(s) 1826 include any combination of hardwired links, wireless links, routers, gateway functionality, name servers, etc., governed by any protocol or combination of protocols.

FIG. 18 shows the computing system 1802 as being composed of a discrete collection of separate units. In some cases, the collection of units corresponds to discrete hardware units provided in a computing device chassis having any form factor. FIG. 18 shows illustrative form factors in its bottom portion. In other cases, the computing system 1802 includes a hardware logic unit that integrates the functions of two or more of the units shown in FIG. 18. For instance, in some implementations, the computing system 1802 includes a system on a chip (SoC or SOC), corresponding to an integrated circuit that combines the functions of two or more of the units shown in FIG. 18.

The following summary provides a set of illustrative examples of the technology set forth herein.

(A1) According to one aspect, a method (e.g., the process 1302) is described for identifying and resolving prohibited maneuvers in routes generated by a routing system (e.g., the routing system 104). The method includes: receiving (e.g., in block 1304) a set of candidate routes produced by the routing system using routing-engine network data, the set of candidate routes having different starting and ending locations; receiving (e.g., in block 1306) first route-related validation data from a first source; receiving (e.g., in block 1308) second route-related validation data from a second source; producing (e.g., in block 1310) first validation results by comparing the set of candidate routes with the first route-related validation data; producing (e.g., in block 1312) second validation results by comparing the set of candidate routes with the second route-related validation data; identifying (e.g., in block 1314) prohibited maneuvers in the set of candidate routes that are independently confirmed by both the first validation results and the second validation results; and revising (e.g., in block 1314) the routing system to eliminate or reduce at least one factor that is causing generation of routes containing the prohibited maneuvers identified in the identifying. The routing system, as revised, is subsequently used, in conjunction with a navigation system, to guide users over a physical roadway in a safer and more efficient manner (compared to a state of the routing system prior to the revisions being made).

(A2) According to some implementations of the method of A1, the prohibited maneuvers that are determined include any of: navigation over a non-navigable route portion; and/or a prohibited turn; and/or navigation over a route portion in a direction that is prohibited.

(A3) According to some implementations of the methods of A1 or A2, the method further includes snapping at least the first route-related validation data to a road network described by a common base map data.

(A4) According to some implementations of the method of A3, the common base map data is the routing-engine network data used by the routing system.

(A5) According to some implementations of any of the methods of A1-A4, the method further includes receiving third route-related validation data and producing third validation results by comparing the set of candidate routes with the third route-related validation data, wherein the identifying is also based on the third validation results.

(A6) According to some implementations of any of the methods of A1-A5, the first route-related validation data is a collection of traces measured by position-determining devices as the position-determining devices traverse actual routes. The producing first validation results includes: identifying a group of traces within a prescribed geographic proximity to a particular candidate route; determining whether a particular segment of the particular candidate route is found in at least a first prescribed number of traces in the group of traces, at a same time at which the particular segment occurs; identifying a pair of segments in the candidate route that is joined at a maneuver point associated with a maneuver; and determining whether the pair of segments in the particular candidate route is found in at least a second prescribed number of traces in the group of traces, at a same time at which the pair of segments occurs.

(A7) According some implementations of the method of claim 6, the producing first validation results further includes: designated the particular segment as matched, even though the particular segment does not match the first prescribed number of traces, based on a consideration of a profile of the particular segment, and a consideration of a profile of a preceding group of one or more neighboring segments that precede the particular segment, and a profile of a following group of one or more neighboring segments that follow the particular segment; and designating the pair of segments as matched, even though the pair of segments does not match the second prescribed number of traces, based on a consideration of the profile of the particular segment, and a consideration of a profile of a preceding group of one or more neighboring segments that precede the pair of segments, and a profile of a following group of one or more neighboring segments that follow the pair of segments. The profile of a particular group specifies at least whether each neighboring segment in the particular group is matched or unmatched.

(A8) According to some implementations of any of the methods of A1-A7, the second route-related validation data is reference map data. The producing second validation results includes: identifying a set of route entities in the routing-engine network data or the reference map data, each route entity describing a route portion having common properties; based the set of route entities that are identified, identifying a pair of neighboring route entities in a particular candidate route that are joined at a maneuver point associated with a maneuver, the two neighboring route entities having a first neighboring route entity and a second neighboring route entity; identifying a first mini-route, using the routing-engine network data, between a beginning point of the first neighboring route entity and an ending point in the second neighboring route entity; identifying a second mini-route, based on the map reference data, between the beginning point of the first neighboring route entity and the ending point of the second neighboring route entity; and determining whether the first mini-route matches the second mini-route.

(A9) According to some implementations of the method of A8, the determining whether the first mini-route matches the second mini-route includes determining whether bounding shapes associated with the first mini-route and the second mini-route, respectively, overlap by a prescribed amount.

(A10) According to some implementations of any of the methods of A1-A9, the first validation results and the second validation results are binary results, a binary result having two values, a first indicating that a particular conclusion applies, and a second indicating that the particular conclusion does not apply.

(A11) According to some implementations of any of the methods of A1-A9, the first validation results and the second validation results are probabilistic results, a probabilistic result indicating a likelihood of a particular conclusion that is a capable of ranging over plural values, including values between zero percent and 100 percent.

(A12) According to some implementations of any of the methods of A1-A11, the method further includes: generating a presentation for a particular prohibited maneuver that has been identified; and receiving manually-specified classification information that specifies a cause of the particular prohibited maneuver.

(A13) According to some implementations of the method of A12, the presentation includes an aerial-captured image and/or a satellite-captured image of a map region associated with the prohibited maneuver.

(A14) According to some implementations of any of the methods of A1-A13, the revising the routing system includes correcting one or more errors in the routing-engine network data.

(A15) According to some implementations of any of the methods of A1-A14, 15, the revising the routing system includes modifying routing logic used by the routing system to generate routes.

In yet another aspect, some implementations of the technology described herein include a computing system (e.g., the computing system 1802) that includes a processing system (e.g., the processing system 1804) having a processor. The computing system also includes a storage device (e.g., the computer-readable storage media 1806) for storing computer-readable instructions (e.g., information 1808). The processing system executes the computer-readable instructions to perform any of the methods described herein (e.g., any individual method of the methods of A1-A15).

In yet another aspect, some implementations of the technology described herein include a computer-readable storage medium (e.g., the computer-readable storage media 1806) for storing computer-readable instructions (e.g., the information 1808). A processing system (e.g., the processing system 1804) executes the computer-readable instructions to perform any of the operations described herein (e.g., the operations in any individual method of the methods of A1-A15).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1812 of FIG. 18. In some examples, the term "logic" likewise encompasses various physical and tangible mechanisms for performing a task. For instance, each processing-related operation illustrated in the flowcharts of FIGS. 13-16 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single route entity is not intended to preclude the use of plural such route entities; similarly, a description of plural route entities in the specification is not intended to preclude the use of a single route entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying and resolving prohibited maneuvers in routes generated by a computer-implemented routing system, comprising:
   receiving a set of candidate routes sampled from a collection of routes generated by the routing system based on routing-engine network data in response to submitted requests, the set of candidate routes having different starting and ending locations, the routing-engine network data being provided in a data store of the routing system and describing a physical roadway network;
   receiving first route-related validation data from a first source, wherein the first route-related validation data is a collection of Global Positioning System (GPS) traces measured by position-determining devices at respective sampling rates as the position-determining devices traverse actual routes;

receiving second route-related validation data from a second source, wherein the second route-related validation data is reference map data produced by another computer-implemented system that describes a same roadway network as the routing-engine network data used by the routing system;

producing first validation results by comparing the set of candidate routes with the first route-related validation data;

producing second validation results by comparing the set of candidate routes with the second route-related validation data, the producing second validation results being performed independently of the first validation results;

identifying prohibited maneuvers in the set of candidate routes that are independently confirmed by both the first validation results and the second validation results;

revising the routing system using a correction system to eliminate or reduce at least one factor that is causing generation of routes containing the prohibited maneuvers identified in the identifying, to provide a revised routing system, the correction system including functions for correcting one or more data errors in the routing-engine network data in the data store, and modifying logic used by the routing system to generate routes, the logic being at least one of machine-trained instructions that execute a routing algorithm or a machine-trained model;

receiving requests by the revised routing system, each request that is received specifying a starting and ending location; and generating and providing routes using the revised routing system in response to the requests, the routes providing guidance on how to navigate over a physical roadway network.

2. The method of claim 1, wherein the prohibited maneuvers that are determined include any of:
navigation over a non-navigable route portion; and/or
a prohibited turn; and/or
navigation over a route portion in a direction that is prohibited.

3. The method of claim 1, further comprising snapping at least the first route-related validation data to a road network described by a common base map data.

4. The method of claim 3, wherein the common base map data is the routing-engine network data used by the routing system.

5. The method of claim 1, further comprising receiving third route-related validation data and producing third validation results by comparing the set of candidate routes with the third route-related validation data, wherein the identifying is also based on the third validation results.

6. The method of claim 1, wherein the producing first validation results comprises:
identifying a group of GPS traces within a prescribed geographic proximity to a particular candidate route;
determining whether a particular segment of the particular candidate route is found in at least a first prescribed number of GPS traces in the group of GPS traces, at a same time at which the particular segment occurs;
identifying a pair of segments in the candidate route that is joined at a maneuver point associated with a maneuver; and
determining whether the pair of segments in the particular candidate route is found in at least a second prescribed number of GPS traces in the group of GPS traces, at a same time at which the pair of segments occurs.

7. The method of claim 6, wherein the producing first validation results further comprises:
designated the particular segment as matched, even though the particular segment does not match the first prescribed number of GPS traces, based on a consideration of a profile of the particular segment, and a consideration of a profile of a preceding group of one or more neighboring segments that precede the particular segment, and a profile of a following group of one or more neighboring segments that follow the particular segment; and
designating the pair of segments as matched, even though the pair of segments does not match the second prescribed number of GPS traces, based on a consideration of the profile of the particular segment, and a consideration of a profile of a preceding group of one or more neighboring segments that precede the pair of segments, and a profile of a following group of one or more neighboring segments that follow the pair of segments, the profile of a particular group specifying at least whether each neighboring segment in the particular group is matched or unmatched.

8. The method of claim 1, wherein the producing second validation results comprises:
identifying a set of route entities in the routing-engine network data or the reference map data, each route entity describing a route portion having common properties;
based at least in part on the set of route entities that are identified, identifying a pair of neighboring route entities in a particular candidate route that are joined at a maneuver point associated with a maneuver, the two neighboring route entities having a first neighboring route entity and a second neighboring route entity;
identifying a first mini-route, using the routing-engine network data, between a beginning point of the first neighboring route entity and an ending point in the second neighboring route entity;
identifying a second mini-route, based on the map reference data, between the beginning point of the first neighboring route entity and the ending point of the second neighboring route entity; and
determining whether the first mini-route matches the second mini-route.

9. The method of claim 8, wherein the determining whether the first mini-route matches the second mini-route comprises determining whether bounding shapes associated with the first mini-route and the second mini-route, respectively, overlap by a prescribed amount.

10. The method of claim 1, wherein the first validation results and the second validation results are binary results, a binary result having two values, a first indicating that a particular conclusion applies, and a second indicating that the particular conclusion does not apply.

11. The method of claim 1, wherein the first validation results and the second validation results are probabilistic results, a probabilistic result indicating a likelihood of a particular conclusion that is a capable of ranging over plural values, including values between zero percent and 100 percent.

12. The method of claim 1, further comprising:
generating a presentation for a particular prohibited maneuver that has been identified; and receiving manually-specified classification information that specifies a cause of the particular prohibited maneuver.

13. The method of claim 12, wherein the presentation includes an aerial-captured image and/or a satellite-captured image of a map region associated with the prohibited maneuver.

14. A computing system for identifying and resolving prohibited maneuvers in routes generated by a computer-implemented routing system, comprising:
an instruction data store for storing computer-readable instructions;
a processing system for executing the computer-readable instructions in the data store, to perform operations including:
receiving a set of candidate routes sampled from a collection of routes generated by the routing system based on routing logic that operates on routing-engine network data in response to submitted requests, the set of candidate routes having different starting and ending locations, the routing-engine network data being provided in a data store of the routing system and describing a physical roadway network;
receiving a collection of Global Positioning System (GPS) traces measured by position-determining devices at respective sampling rates as the position-determining devices traverse actual routes;
receiving reference map data, wherein the reference map data is produced by another computer-implemented system that describes a same roadway network as the routing-engine network data used by the routing system;
producing first validation results by comparing the set of candidate routes with the collection of GPS traces;
producing second validation results by comparing the set of candidate routes with the reference map data;
determining prohibited maneuvers in the set of candidate routes that are independently confirmed by both the first validation results and the second validation results;
revising the routing system using a correction system to eliminate or reduce at least one factor that is causing generation of routes containing the prohibited maneuvers identified in the determining, to provide a revised routing system, the correction system including functions for correcting one or more data errors in the routing-engine network data in the data store, and modifying logic used by the routing system to generate routes, the logic being at least one of machine-trained instructions that execute a routing algorithm or a machine-trained model;
receiving requests by the revised routing system, each request that is received specifying a starting and ending location; and
generating and providing routes using the revised routing system in response to the requests, the routes providing guidance on how to navigate over a physical roadway network,
wherein the producing first validation results comprises:
snapping the collection of GPS traces to a road network described by the routing-engine network data;
identifying a group of GPS traces, produced by the snapping, within a prescribed geographic proximity to a particular candidate route;
determining whether a particular segment of the particular candidate route is found in at least a first prescribed number of GPS traces in the group of GPS traces, at a same time at which the particular segment occurs;
identifying a pair of segments in the candidate route that is joined at a maneuver point associated with a maneuver; and
determining whether the pair of segments in the particular candidate route is found in at least a second prescribed number of GPS traces in the group of GPS traces, at a same time at which the pair of segments occurs.

15. The computing system of claim 14, wherein the producing second validation results comprises:
identifying a set of route entities in the routing-engine network data or the reference map data, each route entity describing a route portion having common properties;
based the set of route entities that are identified, identifying a pair of neighboring route entities in a particular candidate route that are joined at a maneuver point associated with a maneuver, the two neighboring route entities having a first neighboring route entity and a second neighboring route entity;
identifying a first mini-route, using the routing-engine network data, between a beginning point of the first neighboring route entity and an ending point in the second neighboring route entity;
identifying a second mini-route, based on the map reference data, between the beginning point of the first neighboring route entity and the ending point of the second neighboring route entity; and
determining whether the first mini-route matches the second mini-route.

16. A computer-readable storage medium for storing computer-readable instructions, a processing system executing the computer-readable instructions to perform operations, the operations comprising:
receiving a set of candidate routes sampled from a collection of routes generated by a computer-implemented routing system based on routing-engine network data in response to submitted requests, the set of candidate routes having different starting and ending locations, the routing-engine network data being provided in a data store of the routing system and describing a physical roadway network;
receiving first route-related validation data from a first source, wherein the first route-related validation data is a collection of Global Positioning System (GPS) traces measured by position-determining devices at respective sampling rates as the position-determining devices traverse actual routes;
receiving second route-related validation data from a second source;
producing first validation results by comparing the set of candidate routes with the first route-related validation data;
producing second validation results by comparing the set of candidate routes with the second route-related validation data;
determining prohibited maneuvers in the set of candidate routes that are independently confirmed by both the first validation results and the second validation results, the prohibited maneuvers including: a first type of prohibited maneuver occurring when there is navigation over a non-navigable route portion; a second type of prohibited maneuver occurring when there is a prohibited turn; and a third type of prohibited maneuver occurring when there is navigation over a route portion in a direction that is prohibited;
revising the routing system using a correction system to eliminate or reduce at least one factor that is causing generation of routes containing the prohibited maneuvers identified in the determining, to provide a revised routing system, the correction system including functions for correcting one or more data errors in the routing-engine network data in the data store, and modifying logic used by the routing system to generate routes, the logic being at least one of machine-trained instructions that execute a routing algorithm or a machine-trained model;

receiving requests by the revised routing system, each request that is received specifying a starting and ending location; and generating and providing routes using the revised routing system in response to the requests, the routes providing guidance on how to navigate over a physical roadway network, wherein the second route-related validation data is reference map data produced by another computer-implemented system, and wherein the producing second validation results comprises:

identifying a set of route entities in the routing-engine network data or the reference map data, each route entity describing a route portion having common properties;

based at least in part on the set of route entities that are identified, identifying a pair of neighboring route entities in a particular candidate route that are joined at a maneuver point associated with a maneuver, the two neighboring route entities having a first neighboring route entity and a second neighboring route entity;

identifying a first mini-route, using the routing-engine network data, between a beginning point of the first neighboring route entity and an ending point in the second neighboring route entity;

identifying a second mini-route, based on the map reference data, between the beginning point of the first neighboring route entity and the ending point of the second neighboring route entity; and determining whether the first mini-route matches the second mini-route.

17. The method of claim 1, wherein the routing system is implemented by servers.

18. The method of claim 1, wherein, for at least some of the routes that are provided in response to the requests that are received, guidance is provided by navigation systems, each of the navigation systems providing guidance in following a provided route based on real-time feedback provided by a position-measuring device.

19. The method of claim 1, wherein the correcting one or more data errors includes correcting one or more errors in attributes of roadways in the routing-engine network data.

20. The method of claim 1, further comprising revising status of at least some matches made using the first validation data from an unmatched status to a matched status when prescribed conditions are met, the status being revised to account for noise and sampling insufficiencies in measuring the GPS traces in the collection of GPS traces.

* * * * *